United States Patent
Yasuda et al.

(10) Patent No.: US 7,964,281 B2
(45) Date of Patent: Jun. 21, 2011

(54) TRANSPARENT CONDUCTOR

(75) Inventors: Noriyuki Yasuda, Tokyo (JP); Chieko Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/453,203

(22) Filed: May 1, 2009

(65) Prior Publication Data

US 2009/0226743 A1 Sep. 10, 2009

Related U.S. Application Data

(62) Division of application No. 11/288,380, filed on Nov. 29, 2005.

(30) Foreign Application Priority Data

| Nov. 30, 2004 | (JP) | 2004-347652 |
| Nov. 30, 2004 | (JP) | 2004-347657 |
| Dec. 28, 2004 | (JP) | 2004-381137 |

(51) Int. Cl.
  B32B 27/18 (2006.01)
  B32B 27/20 (2006.01)
  B32B 27/30 (2006.01)
  B32B 27/32 (2006.01)
  B32B 27/36 (2006.01)

(52) U.S. Cl. ........ 428/412; 428/212; 428/328; 428/329; 428/331; 428/403; 428/404; 428/405; 428/480; 428/483; 428/515; 428/516; 428/520; 428/522; 428/523

(58) Field of Classification Search .................. None
See application file for complete search history.

(56) References Cited

U.S. PATENT DOCUMENTS

| 4,117,209 | A | * | 9/1978 | Markin et al. ................ 429/104 |
| 4,683,082 | A | * | 7/1987 | Ehrreich ........................ 252/506 |
| 4,702,963 | A | * | 10/1987 | Phillips et al. ................ 428/426 |
| 4,715,986 | A | * | 12/1987 | Gruning et al. ................ 516/100 |
| 4,835,061 | A | * | 5/1989 | Ohta et al. .................... 428/469 |
| 5,695,901 | A | * | 12/1997 | Selim ........................ 430/106.2 |
| 5,820,994 | A | * | 10/1998 | Gotoh et al. .................. 428/451 |
| 6,039,831 | A | * | 3/2000 | Mine et al. .................. 156/272.6 |
| 6,084,007 | A | * | 7/2000 | Narukawa et al. ............ 523/161 |
| 6,136,444 | A | * | 10/2000 | Kon et al. .................. 428/423.1 |
| 6,280,861 | B1 | * | 8/2001 | Hosokawa et al. ........... 428/690 |
| 6,420,456 | B1 | * | 7/2002 | Koski ............................ 523/213 |
| 6,524,499 | B1 | | 2/2003 | Takamiya et al. |
| 6,549,195 | B2 | * | 4/2003 | Hikida et al. ................. 345/173 |
| 6,635,343 | B2 | | 10/2003 | Inoue et al. |

(Continued)

FOREIGN PATENT DOCUMENTS

JP   A-63-237940   10/1988

(Continued)

OTHER PUBLICATIONS

Aug. 7, 2009 Office Action issued in U.S. Appl. No. 11/288,380.

(Continued)

*Primary Examiner* — Vivian Chen
(74) *Attorney, Agent, or Firm* — Oliff & Berridge, PLC

(57) ABSTRACT

The invention relates to a transparent conductor provided with a base comprising a first a resin, a conductive layer comprising conductive particles and a second resin, and an intermediate layer composed of a third resin formed between the base and the conductive layer, wherein the glass transition temperature Tg of the intermediate layer is lower than the Tg of the conductive layer.

5 Claims, 4 Drawing Sheets

U.S. PATENT DOCUMENTS

| | | |
|---|---|---|
| 6,689,458 B1 * | 2/2004 | Mikoshiba et al. ............ 428/339 |
| 6,743,524 B2 * | 6/2004 | Schaepkens ................. 428/689 |
| 6,787,202 B2 | 9/2004 | Mizutani et al. |
| 6,797,210 B2 * | 9/2004 | Iijima ........................... 264/112 |
| 6,896,981 B2 | 5/2005 | Iwabuchi et al. |
| 7,153,620 B2 * | 12/2006 | Aylward et al. ................. 430/62 |
| 7,186,465 B2 * | 3/2007 | Bright ........................... 428/482 |
| 7,190,354 B2 * | 3/2007 | Tanaka et al. ................. 345/173 |
| 7,229,703 B2 * | 6/2007 | Kawashima et al. ......... 428/690 |
| 7,244,494 B2 * | 7/2007 | Iijima ........................... 428/354 |
| 7,294,298 B2 | 11/2007 | Iijima |
| 7,435,906 B2 | 10/2008 | Yasuda et al. |
| 7,532,290 B2 * | 5/2009 | Majumdar et al. ............ 349/122 |
| 2002/0012789 A1 * | 1/2002 | Iijima ........................... 428/328 |
| 2002/0022156 A1 * | 2/2002 | Bright ........................... 428/698 |
| 2002/0037399 A1 * | 3/2002 | Tamai et al. .................. 428/328 |
| 2003/0008135 A1 | 1/2003 | Kawamura et al. |
| 2005/0221069 A1 * | 10/2005 | Iijima et al. ................... 428/212 |
| 2005/0249941 A1 * | 11/2005 | Iijima ........................... 428/328 |
| 2009/0226743 A1 | 9/2009 | Yasuda et al. |
| 2009/0242846 A1 * | 10/2009 | Yasuda et al. ................ 252/500 |
| 2010/0044073 A1 * | 2/2010 | Yasuda et al. .............. 174/126.1 |

FOREIGN PATENT DOCUMENTS

| | | | |
|---|---|---|---|
| JP | A-08-078164 | | 3/1996 |
| JP | A-8-207212 | | 8/1996 |
| JP | A-8-211374 | | 8/1996 |
| JP | A-8-220332 | | 8/1996 |
| JP | A-08-244187 | | 9/1996 |
| JP | 09-007420 | * | 1/1997 |
| JP | B2-2667680 | | 6/1997 |
| JP | A-10-255555 | | 9/1998 |
| JP | A-10-296898 | | 11/1998 |
| JP | A-10-296899 | | 11/1998 |
| JP | 10-323932 | * | 12/1998 |
| JP | A-10-323931 | | 12/1998 |
| JP | A-10-329257 | | 12/1998 |
| JP | A-10-334744 | | 12/1998 |
| JP | A-11-242916 | | 9/1999 |
| JP | A-11-273874 | | 10/1999 |
| JP | A-11-301775 | | 11/1999 |
| JP | A-2000-123658 | | 4/2000 |
| JP | 2000-238176 | * | 9/2000 |
| JP | A-2001-52530 | | 2/2001 |
| JP | A-2001-083327 | | 3/2001 |
| JP | A-2002-150842 | | 5/2002 |
| JP | A-2002-196874 | | 7/2002 |
| JP | A-2002-234961 | | 8/2002 |
| JP | 2003-016842 | * | 1/2003 |
| JP | A-2004-047456 | | 2/2004 |
| JP | A-2004-237996 | | 8/2004 |
| KR | 10-0347973 | | 9/1996 |
| KR | 2001-0108271 | | 12/2001 |
| KR | 10-2004-0028670 | | 4/2004 |
| WO | WO 01/48764 A1 | | 7/2001 |
| WO | WO 03/020509 A1 | | 3/2003 |
| WO | WO 03/100974 A1 | | 12/2003 |
| WO | WO 2004/011242 | * | 2/2004 |
| WO | WO 2004/011243 | * | 2/2004 |

OTHER PUBLICATIONS

Jan. 25, 2010 Notice of Allowance issued in U.S. Appl. No. 11/288,380.

* cited by examiner

TRANSPARENT CONDUCTOR

This is a Divisional of U.S. patent application Ser. No. 11/288,380 filed on Nov. 29, 2005, which is hereby incorporated by reference in its entirety. This application claims priority to Japanese Patent Application Nos. 2004-347652 filed Nov. 30, 2004, 2004-347657 filed Nov. 30, 2004 and 2004-381137 filed Dec. 28, 2004, which are hereby incorporated by reference in their entirety.

BACKGROUND OF THE INVENTION

1. Field of the Invention

The present invention relates to a transparent conductor.

2. Related Background Art

Transparent electrodes are used in LCDs, PDPs, organic ELs, touch panels and the like, and transparent conductors are employed as such transparent electrodes. A transparent conductor is formed from a base and a conductive layer, and some transparent conductors are obtained by film formation of a sputtering film (conductive layer) on the base, or by forming a conductive layer made of conductive particles and a binder on the base. However, when such transparent conductors are employed in high-humidity environments or in the presence of chemical substances such as organic solvents or organic gases (hereinafter also referred to as "high-humidity environments"), they gradually absorb moisture and chemical substances leading to increased electrical resistance of the transparent conductors themselves, and the variation in electrical resistance also tends to increase with time.

Thus, when such transparent conductors are used in a touch panel, for example, and left to stand in such an environment, the operability of the touch panel tends to become unstable.

A demand therefore exists for transparent conductors whose electrical resistance does not increase or vary with time as a result of absorption of moisture or chemical substances. Examples of resins for anchorage of conductive particles have been proposed, such as light-transparent conductive materials employing phenoxy resins or phenoxy/epoxy mixed resins, or polyvinylidene fluoride, which are considered to have low hygroscopicity (for example, see Japanese Unexamined Patent Publication HEI No. 8-78164 and Japanese Unexamined Patent Publication HEI No. 11-273874).

Since the aforementioned transparent conductors are formed by lamination of a base and conductive layer, warping or bending of the base produces bends in the conductive layer as well, and the conductive layer which is less flexible than the base becomes prone to cracking. Such transparent conductors are problematic because they generally exhibit increased electrical resistance.

Particularly when such a transparent conductor is used in a touch panel, the transparent conductor is subjected to a greater frequency of distortion because of the pressure normally applied to it. In such cases, the potential for cracking in the conductive layer of the transparent conductor is increased. If the conductive layer is formed as a sputtering film, the possibility of cracking is even greater since the conductive layer lacks flexibility.

It is therefore desirable to provide a transparent conductor in which such cracking is prevented without impairing the conductivity and transparency of the transparent conductor. For example, a transparent conductive laminated body has been proposed which comprises a transparent pressure-sensitive adhesive layer between the film base and the conductive layer (for example, see Japanese Patent Publication No. 2667680).

SUMMARY OF THE INVENTION

Recently, however, with ever increasing demands for high reliability of transparent conductors, it has been a goal to achieve transparent conductors with even lower variation in electrical resistance even in environments such as described above.

When the transparent conductive laminated body described in Japanese Patent Publication No. 2667680 is used for prolonged periods in a touch panel or the like, it is difficult to adequately prevent cracking in the conductive layer without hindering the conductivity or transparency of the transparent conductor, and therefore much room for improvement remains.

The present invention has been accomplished in light of the circumstances described above, and its purpose is to provide a transparent conductor which adequately prevents electrical resistance increase or variation with time in the type of environment described above. It is another purpose of the invention to provide a transparent conductor which adequately prevents cracking of the conductive layer without impairing the conductivity or transparency of the transparent conductor even during prolonged periods of use.

As a result of much diligent research conducted with the aim of solving the aforementioned problems, the present inventors have discovered that electrical resistance is sometimes increased even when using resins considered to have low hygroscopicity as described in the aforementioned Japanese Unexamined Patent Publication HEI No. 8-78164 and Japanese Unexamined Patent Publication HEI No. 11-273874, especially when they are used for prolonged periods in high-humidity environments. Specifically, the present inventors conjectured that when moisture or chemical substances such as solvents or organic gases diffuse into a transparent conductor comprising a base and a conductive layer, the resin in the base may swell causing concomitant stretching of the conductive layer, whereby the bonding points between the conductive particles are severed and the electrical resistance increases. Moreover, based on further diligent research based on this conjecture, the present inventors discovered that the aforementioned problems can be overcome by the invention described below, and eventually completed the invention.

In other words, the transparent conductor of the invention is provided with a base comprising a first a resin, a conductive layer comprising conductive particles and a second resin, and an intermediate layer composed of a third resin formed between the base and the conductive layer, wherein the glass transition temperature Tg of the intermediate layer is lower than the Tg of the conductive layer. The transparent conductor of the invention may be in the form of a film or sheet, where a film-like transparent conductor is defined as one with a thickness in the range of 50 nm to 1 mm and a sheet-like transparent conductor is defined as one with a thickness exceeding 1 mm.

According to the transparent conductor of the invention, the Tg of the intermediate layer is lower than the Tg of the conductive layer. Thus, when the transparent conductor is left in a high-humidity environment or in a chemical substance environment, the first resin in the base swells and stress which could stretch the conductive layer is transmitted from the base, but the intermediate layer performs the function of buffering the stress. Consequently, even when the transparent conductor is left in such environments, stretching of the conductive layer is adequately prevented, severing of the bonding points between the conductive particles in the conductive layer is prevented, and increase or temporal variation in the electrical resistance of the transparent conductor can be adequately inhibited. The transparent conductor of the invention is particularly effective because the intermediate layer sufficiently performs the function of buffering stress even when the base has a low Tg, i.e. when the base is prone to stretching. The Tg of the intermediate layer is preferably no higher than 20° C.

In the transparent conductor, the difference in Tg of the intermediate layer and conductive layer is preferably 40° C. or greater. This will allow the intermediate layer to more effectively exhibit the stress-buffering function. As a result, the transparent conductor will more satisfactorily inhibit increase or temporal variation in the electrical resistance of the transparent conductor even in high-humidity environments.

The pencil hardness of the conductive layer of the transparent conductor is preferably greater than the pencil hardness of the intermediate layer. If the pencil hardness of the conductive layer is greater than the pencil hardness of the intermediate layer, increase in resistance in the environments described above will be further prevented while scratch resistance and abrasion resistance will be improved.

The second resin in the transparent conductor preferably has a crosslinked structure. A crosslinked structure for the second resin can prevent infiltration of moisture or chemical substances into the interior of the transparent conductor, to allow increase or temporal variation in the electrical resistance of the obtained transparent conductor to be more satisfactorily inhibited even in the environments described above. In addition, chemical bonding of the resin and conductive particles can further lessen the effects of swelling due to humidity or chemical substances, as well as external forces.

The Tg of the conductive layer in the transparent conductor is preferably −40° C. or above. A Tg of −40° C. or above will help maintain the shape and form of the transparent conductor even when it is used for prolonged periods of time.

Preferably, the first resin in the transparent conductor is polyethylene terephthalate and the second resin is an acrylic resin. Such a transparent conductor exhibits superior durability.

In addition to a greater pencil hardness of the conductive layer relative to the intermediate layer in the transparent conductor, the surface hardness of the conductive layer is also preferably 2H or greater. This provides an advantage of greater durability against external forces.

The present inventors have further discovered that the aforementioned problems can be solved by the following invention as well. Specifically, this transparent conductor of the invention is provided with a base, a conductive layer comprising conductive particles and a resin, and a barrier layer comprising a metal and an inorganic compound, wherein the barrier layer is formed between the base and the conductive layer and/or on the side of the base opposite the conductive layer side.

According to this transparent conductor of the invention, the barrier layer comprising a metal or an inorganic compound can inhibit infiltration of moisture or chemical substances such as solvents and organic gases into the base which can cause swelling of the base, so that swelling of the base may be adequately prevented. Thus, stretching of the conductive layer in response to swelling of the base is prevented, while severing of bonding points between the conductive particles is also adequately prevented. Consequently, a transparent conductor according to the invention can satisfactorily inhibit increase or temporal variation in electrical resistance of the transparent conductor even in the environments described above.

Preferably, the barrier layer in the transparent conductor is formed between the base and the conductive layer, the barrier layer is a continuous conductive layer comprising a simple metal or a conductive oxide, and the barrier layer is in contact with the conductive particles in the conductive layer.

If the barrier layer is composed of a metal or an inorganic compound, the transparent conductor will be likewise able to inhibit infiltration of moisture or organic gases into the base. In addition, the since the barrier layer of the transparent conductor is a continuous conductive layer, the transparent conductor will be able to maintain continuity between the conductive particles through the continuously conductive barrier layer, even when bonding points between conductive particles have been severed as a result of swelling of the base. Thus, increase or temporal variation in the electrical resistance of the transparent conductor can be more fully inhibited even in a high-humidity environment or a chemical substance atmosphere.

The barrier layer of the transparent conductor preferably comprises at least one type of inorganic compound selected from the group consisting of $SiO_2$, $Al_2O_3$, $TiO_2$, ZnO and $ZrO_2$. If the barrier layer comprises such an inorganic compound, the resulting transparent conductor will permit a greater thickness of the barrier layer while maintaining transparency. Consequently, increase or temporal variation in the electrical resistance will be more satisfactorily inhibited even in the environments described above.

The transparent conductor more preferably has barrier layers formed between the base and the conductive layer and on the side of the base opposite the conductive layer side. By forming barrier layers on both sides of the base it is possible to further inhibit infiltration of moisture or organic gases into the interior of the base. It is also effective for shape retention of the base, since the barrier layers themselves exhibit an inhibiting effect against stretching and contraction.

Preferably, the base of the transparent conductor comprises a resin, and the moisture permeability of the barrier layer is lower than that of the base. This can inhibit infiltration of moisture or organic gases into the base which can cause swelling of the resin in the base, so that swelling of the base may be more satisfactorily prevented.

The present inventors conjectured that providing an intermediate layer between the base and the conductive layer might inhibit cracking of the conductive layer so long as the intermediate layer is highly elastic and does not adversely affect the transparency or conductivity. As a result of further diligent research based on this conjecture, the present inventors discovered that the invention described below can achieve the object of preventing cracking of the conductive layer without impairing the conductivity or transparency of the transparent conductor even during prolonged periods of use, and eventually completed the invention.

Specifically, this transparent conductor of the invention is provided with a base, a conductive layer and an intermediate layer comprising a resin and a filler, characterized in that the intermediate layer is formed between the base and the conductive layer.

In this transparent conductor of the invention, the intermediate layer between the base and conductive layer comprises a resin, and the resin performs a force buffering function so that when the base undergoes distortion or bending, the conductive layer is prevented from distorting or bending along with the base. Thus, even when the transparent conductor is used for prolonged periods, cracking of the conductive layer in the transparent conductor is satisfactorily inhibited. The transparent conductor of the invention is particularly effective because the resin performs an adequate buffering function against forces exerted by distortion or bending of the base, even when the conductive layer is formed by a sputtering method which can render it prone to cracking.

In order to exhibit the effect described above, the resin in the intermediate layer is preferably a soft one, but a soft resin will make it difficult to retain the shape of the intermediate layer for long periods. In the transparent conductor of the invention, therefore, a filler is also added to the intermediate layer in order to allow shape retention even when a soft resin is used in the intermediate layer.

Moreover, since the intermediate layer contains a filler, it is possible to inhibit swelling of the resin due to absorption of moisture and chemical substances. In other words, the filler has a shape-retaining function whereby curling of the transparent conductor, caused by absorption of moisture and chemical substances and consequent swelling of the resin, can be prevented.

In the transparent conductor described above, it is preferred for the resin and filler to be chemically bonded together. Such chemical bonding does not include physical adsorption, and this may be determined, for example, by confirming residue of fluorine compounds on the surface of the conductive layer even when the transparent conductor is immersed in a solvent which dissolves fluorine compounds. There is no restriction to such confirmation means, and analysis may be performed by any known analysis method.

In this case, since the positioning of the filler in the intermediate layer is fixed, the position of the filler shifts when the transparent conductor is distorted or bent, but the filler can return to its original position when the force is released (this phenomenon will hereinafter be referred to as "shape memory effect"). Moreover, since the positioning of the filler is fixed, swelling of the intermediate layer is inhibited even when moisture or chemical substances infiltrate into the intermediate layer.

The resin in the transparent conductor described above preferably has a crosslinked structure. A resin with a crosslinked structure can improve the aforementioned shape memory effect and the effect of inhibiting swelling of the intermediate layer in response to infiltration of moisture or chemical substances into the interior of the transparent conductor.

In this transparent conductor, the Tg of the intermediate layer is preferably no higher than 20° C. If the Tg of the intermediate layer is within this range, the softness of the intermediate layer will help to further inhibit cracking of the conductive layer even when the transparent conductor of the invention is used for prolonged periods.

DETAILED DESCRIPTION OF THE PREFERRED EMBODIMENTS

Figure 1:
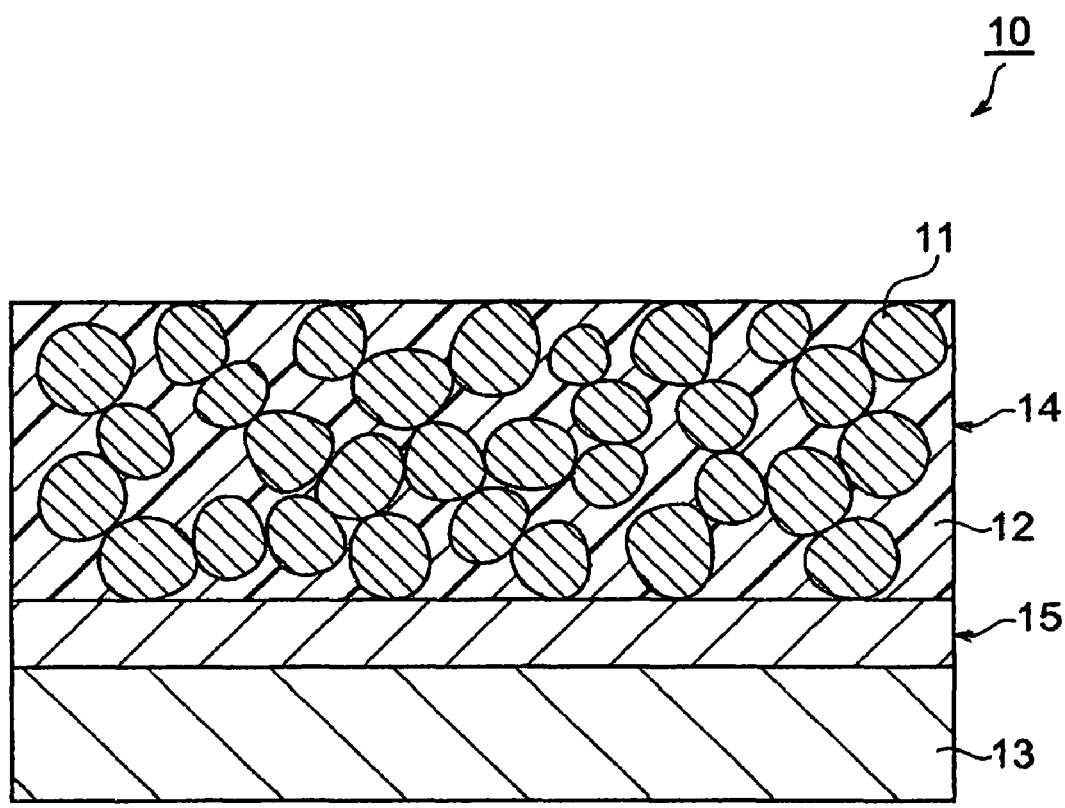
FIG. 1 is a schematic cross-sectional view of a first embodiment of a transparent conductor of the invention.

Preferred embodiments of the invention will now be explained in detail with reference to the accompanying drawings as necessary. Throughout the drawings, corresponding elements will be indicated by identical reference numerals and will be explained only once. The dimensional proportions in the drawings are not limitative.

First Embodiment

A first embodiment of the transparent conductor of the invention will be explained first.

FIG. 1 is a schematic cross-sectional view of an embodiment of a transparent conductor of the invention. As shown in FIG. 1, the transparent conductor 10 of this embodiment comprises a base 13, a conductive layer 14 and an intermediate layer 15 formed between the base 13 and conductive layer 14.

The base 13 comprises a first resin, and the conductive layer 14 comprises a second resin 12 and conductive particles 11 in the second resin 12. The intermediate layer 15 is composed of a third resin.

The intermediate layer 15 has a Tg which is lower than the Tg of the conductive layer 14. Thus, when the transparent conductor 10 is placed in a high-humidity environment and the base 13 swells, whereby stretching stress is transmitted from the base 13 to conductive layer 14, the intermediate layer 15 functions to buffer the stress. Consequently, even if the transparent conductor 10 is placed in a high-humidity environment, stretching of the conductive layer 14 is adequately prevented, severing of the bond points between the conductive particles 11 in the conductive layer 14 is prevented, and increase in the resistance is prevented. As a result, it is possible to satisfactorily inhibit increase or temporal variation in the electrical resistance of the transparent conductor even in high-humidity environments.

The transparent conductor 10 of this embodiment, therefore, can adequately inhibit increase or temporal variation in the electrical resistance of the transparent conductor even in high-humidity environments.

The Tg of the intermediate layer 15 is not particularly restricted so long as it is lower than the Tg of the conductive layer 14, but the Tg of the intermediate layer 15 is preferably no higher than 20° C. The Tg is the value measured by DSC with a temperature elevating rate of 20° C./min.

If the Tg of the intermediate layer 15 is 20° C. or lower, the intermediate layer 15 will exhibit a greater function as a buffering material than if it exceeds 20° C., and it will be possible to more satisfactorily inhibit increase or temporal variation in the electrical resistance of the transparent conductor 10 even in a high-humidity environment or in an atmosphere containing chemical substances. Also, when the Tg is low and the shape cannot be retained, for example, adjustment can be achieved by addition of a filler or the like to the intermediate layer 15. The filler is preferably a transparent oxide, such as silica or the like.

The Tg of the conductive layer is preferably −40° C. or above. A Tg of −40° C. or above will allow retention of the shape of the transparent conductor 10 of this embodiment even when it is used for prolonged periods.

The difference in the Tg of the intermediate layer 15 and conductive layer 14 in the transparent conductor 10 is preferably at least 40° C. This will allow the intermediate layer 15 to more fully exhibit the aforementioned stress-buffering function. Thus, the transparent conductor can satisfactorily inhibit increase or temporal variation in the electrical resistance of the transparent conductor even in high-humidity environments.

The pencil hardness of the conductive layer 14 is preferably greater than the pencil hardness of the intermediate layer 15. Here, the pencil hardness is the surface hardness of a substance of interest measured according to the pencil hardness test method based on JIS K 5400.

If the pencil hardness of the conductive layer 14 is greater than the pencil hardness of the intermediate layer 15, it will be possible to prevent increase in electrical resistance in high-humidity environments and in atmospheres containing chemical substances, while also improving the scratch resistance and abrasion resistance. In addition to greater pencil hardness of the conductive layer 14 relative to the intermediate layer 15, the surface hardness of the conductive layer 14 is also preferably 2H or greater. This has the advantage of resulting in increased durability against external forces. However, the surface hardness of the conductive layer 14 is preferably no greater than 6H because it is necessary to have flexibility.

The conductive layer 14, intermediate layer 15 and base 13 will now each be explained in greater detail.

<Conductive layer> As mentioned above, the conductive layer 14 comprises conductive particles 11 and a second resin 12. The conductive particles 11 are packed in such a manner that adjacent conductive particles 11 are in contact with each other. The function of a conductor will therefore be exhibited.

The conductive particles 11 are composed of a transparent conductive oxide material. The transparent conductive oxide material is not particularly restricted so long as it is transparent and conductive, and examples of transparent conductive oxide materials include indium oxide, indium oxide doped with one or more elements selected from the group consisting of tin, zinc, tellurium, silver, gallium, zirconium, hafnium and magnesium, or tin oxide, tin oxide doped with one or more elements selected from the group consisting of antimony, zinc and fluorine, zinc oxide, or zinc oxide doped with one or more elements selected from the group consisting of aluminum, gallium, indium, boron, fluorine and manganese.

If the conductive particles 11 are composed of such a material, the transparent conductor 10 comprising the conductive particles 11 and second resin 12 will be able to better prevent temporal variation in the electrical resistance even in high-humidity environments.

The mean particle size of the conductive particles 11 is preferably 10-80 nm. If the mean particle size is less than 10 nm, the conductivity of the transparent conductor 10 will tend to vary more than if the mean particle size is 10 nm or greater. That is, the transparent conductor 10 of this embodiment exhibits its conductivity by oxygen defects produced in the conductive particles 11, and with the conductive particles 11 having particles sizes of less than 10 nm, the oxygen defects are reduced in the presence of a high external oxygen concentration, for example, tending to result in variation in the conductivity. On the other hand, if the mean particle sizes is greater than 80 nm, scattering of light in the visible light wavelength region, for example, will be greater than when the mean particle size is 80 nm or smaller, thereby tending to lower the transmittance of the transparent conductor 10 in the visible light wavelength region and increase the haze value.

The fill factor of the conductive particles 11 in the transparent conductor 10 is preferably 10-70 vol %. A fill factor of less than 10 vol % will tend to increase the resistance of the transparent conductor 10, while a fill factor of greater than 70 vol % will tend to lower the mechanical strength of the film.

Limiting the mean particle size and fill factor of the conductive particles 11 to the aforementioned ranges will further improve the transparency of the transparent conductor and reduce the initial electrical resistance.

The area to weight ratio of the conductive particles 11 is preferably 10-50 $m^2/g$. An area to weight ratio of less than 10 $m^2/g$ will tend to increase visible light scattering, while an area to weight ratio of greater than 50 $m^2/g$ will tend to lower the stability of the transparent conductive material. The area to weight ratio referred to here is the value measured after vacuum drying of the sample for 30 minutes at 300° C., using a specific surface area measuring apparatus (Model: NOVA2000, Quantachrome Corp.).

The surfaces of the conductive particles 11 are preferably treated with a surface treatment agent. Treatment of the conductive particle surfaces with a surface treatment agent can inhibit adsorption of moisture onto the conductive particles 11 of the conductive layer 14.

As such surface treatment agents there may be mentioned silane coupling agents, silazane compounds, titanate coupling agents, aluminate coupling agents and phosphonate coupling agents. Silane coupling agents and silazane compounds are particularly preferred. These surface treatment agents include compounds having a wide variety of molecular structures, which may be used as appropriate. Also, any one or combination of two or more types thereof may be used.

Preferred surface treatment agents are those having hydrophobic end groups. Such a condition will improve dispersion of the conductive particles 11 in the second resin 12 of the transparent conductor 10, resulting in enhanced strength and transparency of the transparent conductor 10. One such surface treatment agent that may be mentioned is hexamethyldisilazane.

As hydrophobic groups there may be mentioned vinyl, alkyl, acryloyl, methacryloyl and aryl, and among such hydrophobic groups there are preferred vinyl, alkyl, acryloyl, methacryloyl and aryl. This will further inhibit increase or temporal variation in the electrical resistance when the transparent conductor 10 is placed in a high-humidity environment, as compared to when the hydrophobic groups are groups other than vinyl or the like.

Examples of alkyl groups include methyl, ethyl, propyl, isopropyl, butyl, tert-butyl and stearyl, and examples of aryl groups include phenyl and naphthyl.

Such hydrophobic groups do not participate in the chemical reaction between the surface treatment agent and the hydroxyl groups in the conductive particles 11, and therefore the conductive particles obtained by treatment with the surface treatment agent will have hydrophobic groups on the surface side, i.e. they will have hydrophobic groups as end groups. In other words, hydrophobic treatment of the surfaces of the conductive particles is accomplished in this manner.

The hydrophobic groups are most preferably vinyl or methyl groups. Stated differently, the surface treatment agent is most preferably a surface treatment agent comprising a silane coupling agent or silazane compound wherein the end groups are vinyl or methyl groups as hydrophobic groups.

When the hydrophobic groups are vinyl groups, the surface treatment agent will be able to chemically bond not only with the conductive particles 11 but also with the second resin 12. In this manner of transparent conductor 10, therefore, cohesion between the conductive particles 11 and the second resin 12 is further increased, and it is possible to further inhibit diffusion of moisture into the second resin 12. As a result, increase and temporal variation of the electrical resistance can be more greatly inhibited in high-humidity environments.

When the surface treatment agent has vinyl groups at the ends, the conductive particles 12 which have been treated with the surface treatment agent can be more uniformly dispersed in the second resin 12 of the conductive layer 14, and therefore the haze value is lower than when the conductive particles 11 are aggregated. Consequently, a transparent conductor 10 employing a surface treatment agent with vinyl end groups is particularly useful from the standpoint of transparency. In addition, when the conductive particles 11 which have been treated with the surface treatment agent are uniformly dispersed in the second resin 12, the contact area between the second resin 12 and conductive particles 11 is increased resulting in improvement in the overall strength of the transparent conductor 10.

The surface treatment agent may also contain epoxy groups in the molecule in addition to vinyl groups. This will allow increased rigidity to be produced in the second resin 12 by heat reaction of the epoxy groups after photoreaction of the vinyl groups.

On the other hand, when the hydrophobic groups are methyl groups, the obtained transparent conductor 10 has improved dispersibility of the conductive particles 11 treated with the surface treatment agent, and therefore moisture permeation of the transparent conductor 10 can be reduced by a "filler-pinning" effect. Also, since the methyl groups themselves have a small molecular structure, they produce the least amount of steric hindrance at the bonding points between the conductive particles which have been treated with the surface treatment agent, thereby allowing the bonding points to be maintained more reliably than with other hydrophobic groups, and allowing the transparent conductor 10 to have further reduced initial electrical resistance.

The content of the surface treatment agent is preferably 0.1-5 parts by weight to 100 parts by weight of the conductive particles. If the content is less than 0.1 part by weight, it may not be possible to thoroughly treat the surfaces of the conductive particles 11, while if the content is greater than 5 parts by weight, the effect of treating the surfaces of the conductive particles 11 will tend to be insufficient.

The second resin 12 in the conductive layer 14 is not particularly restricted so long as it is a resin. The second resin 12 is preferably one obtained by curing a photocuring compound or thermosetting compound, i.e. one having a crosslinked structure. This will improve the moisture resistance of the transparent conductor, allowing variation in resistance to be more satisfactorily prevented. Any photocuring compound may be used which is an organic compound cured by light, or any thermosetting compound may be used which is an organic compound cured by heat. Such organic compounds include substances serving as the starting material for the second resin 12, and specifically they include monomers, dimers, trimers or oligomers which can form the second resin 12. A photocuring compound is preferred in the second resin 12. Using a photocuring compound for the curing compound will allow control of the curing reaction and will permit curing to be accomplished in a short period of time, thereby rendering the process management more convenient.

As photocuring compounds there are preferably used monomers containing vinyl groups, epoxy groups or derivatives thereof. These may be used alone or in mixtures of two or more types. When the photocuring compound or thermosetting compound is a polymer compound, the second resin 12 may consist entirely of the photocuring compound or thermosetting compound.

When the conductive particles 11 treated with the aforementioned surface treatment agent in the transparent conductor 10 of this embodiment have vinyl groups on their surfaces, the second resin 12 is preferably an acrylic resin. This will permit chemical bonding between the vinyl groups of the conductive particles 11 that have been treated with the surface treatment agent, and the aforementioned acrylic resin. As a result, cohesion between the surface-treated conductive particles 11 and the cured acrylic resin can be further increased, to allow more adequate control of swelling of the acrylic resin. Thus, increase and temporal variation in the electrical resistance can be more satisfactorily inhibited in high-humidity environments.

The conductive layer 14 may also contain additives as necessary. As such additives there may be mentioned flame retardants, ultraviolet absorbers, coloring agents, plasticizers and the like.

As examples for the second resin 12 there may be mentioned acrylic resin, epoxy resin, fluoro resin.

<Intermediate layer> The intermediate layer 15 is composed of a third resin, and in the transparent conductor 10 of this embodiment it acts as a buffering material. The intermediate layer 15 may be one which has a lower Tg than the Tg of the base 13. That is, the third resin composing the intermediate layer 15 is not particularly restricted so long as it satisfies this condition.

More specifically, for the third resin there may be mentioned polyester resins (PET), polycarbonate resin (PC), polyethersulfone resin (PES), olefin resins, acrylic resins, epoxy resins, urethane resins, norbornene resins (NB) and the like, or cured photocuring compounds and thermosetting compounds may be used instead of such resins. Any photocuring compound may be used which is an organic compound cured by light, or any thermosetting compound may be used which is an organic compound cured by heat. Such organic compounds include substances serving as the starting material for the third resin, and specifically they include monomers, dimers, trimers or oligomers which can form the third resin.

Among these, the third resin is preferably an acrylic resin. Acrylic resins have high transparency and therefore excellent transmittance.

The third resin is preferably a cured photocuring compound. Using a photocuring compound for the curing compound will allow control of the curing reaction and will permit curing to be accomplished in a short period of time, thereby rendering the process management more convenient.

As photocuring compounds there are preferably used monomers containing vinyl groups, epoxy groups or derivatives thereof. They may be used alone or in mixtures of two or more types.

The second resin 12 and the third resin are preferably both cured photocuring compounds, and may be identical or different compounds.

According to this embodiment, the first resin in the base 13 and the third resin composing the intermediate layer 15 are preferably used in the combinations shown in Table 1.

TABLE 1

| First resin | Third resin |
| --- | --- |
| PET | Acrylic resin |
| PC | Acrylic resin |
| PES | Epoxy resin |

Such combinations are advantageous from the standpoint of superior durability of the transparent conductor 10 of this embodiment.

<Base> The base 13 is not particularly restricted so long as it is one composed of a material which comprises the first resin and which is transparent with respect to high-energy rays and visible light, as explained below. For example, the base 13 may be a publicly known transparent film, examples of which include polyester films such as polyethylene terephthalate (PET), polyolefin films such as polyethylene or polypropylene, polycarbonate films, acrylic films, norbornene films (such as ARTON by JSR Corp.), and the like. The base 13 may also contain a filler component such as silica in addition to the resin.

The base 13 preferably consists entirely of the resin. This will result in superior transparency and flexibility of the transparent conductor 10 compared to a base 13 comprising both a resin and a substance other than the resin. Such qualities will therefore be particularly effective for a touch panel or panel switch, for example.

<Production process> A production process for the transparent conductor 10 of this embodiment will now be explained, wherein tin-doped indium oxide (hereinafter, "ITO") is used for the conductive particles 11.

First, the base 13 comprising the first resin is situated on a glass panel. The intermediate layer 15 is then formed on the base 13. An anchor layer may optionally be formed on the base 13 before forming the intermediate layer 15. Pre-forming an anchor layer on the base 13 will allow the intermediate layer 15 to be more firmly anchored on the base 13 via the anchor layer. Polyurethane or the like may be suitably used for the anchor layer.

The intermediate layer 15 is obtained by forming the third resin on the base 13. The third resin used is preferably one whose Tg is lower than the Tg of the third resin in the base 13. Since the intermediate layer reliably performs the function of buffering stress when stretching stress is transmitted from the base 13 to the conductive layer, it helps to more adequately inhibit increase or temporal variation in the electrical resistance of the transparent conductor 10. According to this embodiment, a photocuring compound is coated onto the base 13 as the compound for formation of the third resin. The photocuring compound may optionally be dissolved in a solvent. In this case, the coating is preferably followed by a drying step. The coating method employed may be, for example, a reverse roll method, direct roll method, blade method, knife method, extrusion method, nozzle method, curtain method, gravure roll method, bar coating method, dip method, kiss coating method, spin coating method, squeeze method or spray method. The intermediate layer 15 may be formed by curing the photocuring compound with a high-energy beam. The high-energy beam may be ultraviolet light or an electron beam, γ-rays, X-rays or the like.

The conductive layer 14 containing the conductive particles 11 and the second resin 12 is then formed on the intermediate layer 15. The conductive particles 11 will now be explained.

First, indium chloride and tin chloride are co-precipitated by neutralization using an alkali (co-precipitation step). The salt by-product is removed by decantation or centrifugal separation. The obtained co-precipitate is dried and the obtained dry product is subjected to sintering in a controlled atmosphere and pulverization. This yields the conductive particles 11. From the viewpoint of controlling oxygen defects, the firing treatment is preferably carried out in a nitrogen atmosphere or in a rare gas atmosphere such as helium, argon or xenon.

The surfaces of the conductive particles 11 are preferably treated with a surface treatment agent as described above. This can be accomplished by mixing the conductive particles 11 with the surface treatment agent for reaction.

The conductive particles 11 obtained in this manner are mixed with a photocuring compound as the compound for formation of the second resin 12, and dispersed in a liquid to obtain a dispersion. As liquids for dispersion of the conductive particles 11 and photocuring compound there may be mentioned saturated hydrocarbons such as hexane, aromatic hydrocarbons such as toluene and xylene, alcohols such as methanol, ethanol, propanol and butanol, ketones such as acetone, methyl ethyl ketone, isobutyl methyl ketone and diisobutyl ketone, esters such as ethyl acetate and butyl acetate, ethers such as tetrahydrofuran, dioxane and diethyl ether, and amides such as N,N-dimethylacetamide, N,N-dimethylformamide and N-methylpyrrolidone. The photocuring compound may optionally be dissolved in the liquid for use.

The dispersion obtained in this manner is coated onto the intermediate layer 15. When using a liquid as mentioned above, the coating is preferably followed by a drying step. The coating method employed may be, for example, a reverse roll method, direct roll method, blade method, knife method, extrusion method, nozzle method, curtain method, gravure roll method, bar coating method, dip method, kiss coating method, spin coating method, squeeze method or spray method. The photocuring compound may be cured by irradiation with a high-energy beam after coating of the conductive particles 11 and photocuring compound. The conductive layer 14 is formed in this manner. The high-energy beam may be ultraviolet light or an electron beam, γ-rays, X-rays or the like.

The glass panel is finally released to obtain a transparent conductor 10 as shown in FIG. 1.

The transparent conductor 10 obtained in the manner described above may be suitably used for an anti-noise part, heating element, EL electrode, backlight electrode, LCD, PDP, touch panel or the like.

Second Embodiment

A second embodiment of a transparent conductor 20 according to the invention will now be explained. Constituent elements which are identical or corresponding to those of the first embodiment will be assigned identical reference numerals and will not be explained again.

Figure 2:
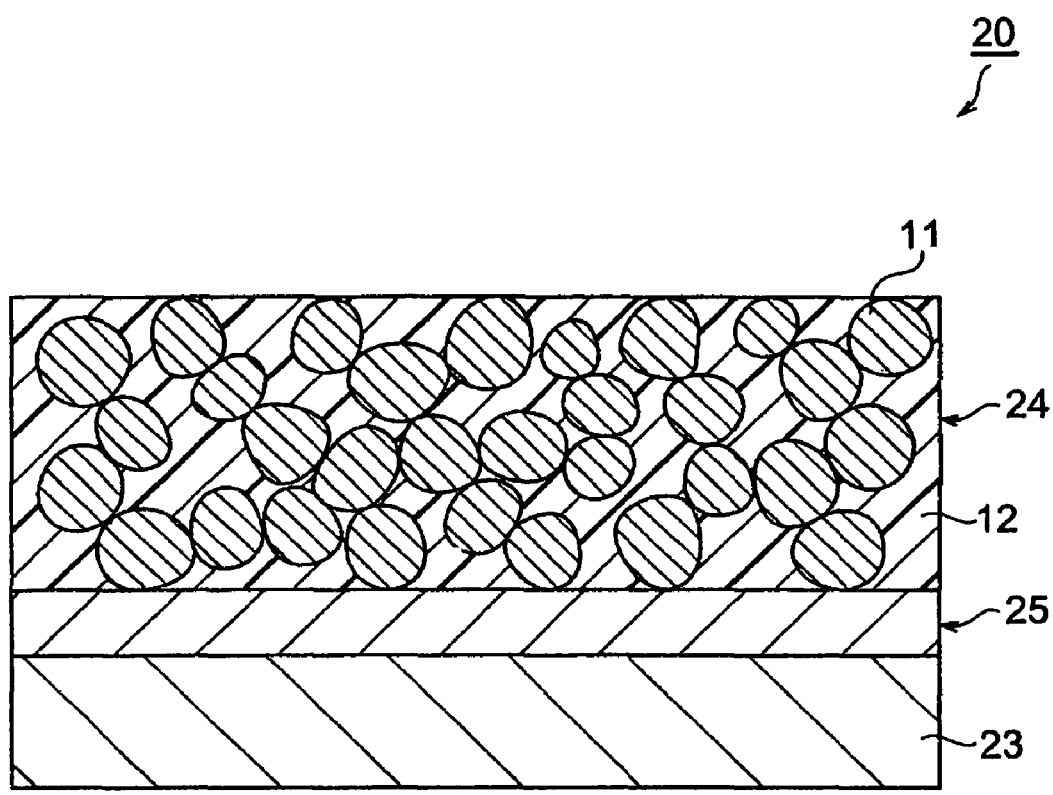
FIG. 2 is a schematic cross-sectional view of a second embodiment of a transparent conductor of the invention.

FIG. 2 is a schematic cross-sectional view of the second embodiment of a transparent conductor of the invention. As shown in FIG. 2, the transparent conductor 20 of this embodiment comprises a base 23, a conductive layer 24 and a barrier layer 25 formed between the base 23 and conductive layer 24.

The base 23 comprises a first resin, and the conductive layer 24 comprises a second resin 12 and conductive particles 11 in the second resin 12. The barrier layer 25 comprises a metal or an inorganic compound. That is, the transparent conductor 20 of this embodiment differs from the transparent conductor 10 of the first embodiment in that the barrier layer 25 comprises a metal or an inorganic compound.

Since the barrier layer 25 comprises a metal or an inorganic compound, the barrier layer 25 has a lower moisture permeability than the base 23. Consequently, the barrier layer 25 allows infiltration of moisture or organic gases into the base 23, which can cause swelling of the base 23, to be inhibited so that swelling of the base 23 is satisfactorily prevented. Thus, stretching of the conductive layer 24 that occurs with swelling of the base 23 is prevented, and severing of the bonding points between conductive particles 11 is sufficiently avoided. With this transparent conductor 20, therefore, increase or temporal variation in the electrical resistance of the transparent conductor 20 can be satisfactorily inhibited even in a high-humidity environment or a chemical substance atmosphere.

The barrier layer 25 will now be described in greater detail.

<Barrier layer> The barrier layer 25 of this embodiment is formed between the base 23 and the conductive layer 24, and it functions to inhibit infiltration of moisture or chemical substances such as solvents and organic gases into the base 23.

As examples of materials for the barrier layer 25 there may be mentioned metals, inorganic compounds and inorganic-organic composite materials, among which metals and inorganic compounds are preferred. If the barrier layer 25 contains a metal or inorganic compound, the transparent conductor 20 will be able to more completely inhibit infiltration of moisture or chemical substances such as solvents or organic gases into the base 23.

There are no particular restrictions on metals used for the barrier layer 25, and as examples there may be mentioned Al, Ag, Au, Cr, Cu, Pd, Pt, Rh, Zn or alloys thereof. As examples of inorganic compounds there may be mentioned metal oxides such as $SiO_2$, $Al_2O_3$, $TiO_2$, ZnO and $ZrO_2$, or conductive oxides such as ITO, IZO, ATO, FTO, AZO and GZO. Among these materials for the barrier layer 25 there are preferred materials containing simple metals or conductive oxides. If the barrier layer 25 is a simple metal or conductive oxide, the barrier layer 25 itself will be conductive, and therefore contact between the barrier layer 25 and the conductive particles 11 in the conductive layer 24 will help to improve the conductivity.

The barrier layer 25 preferably contains at least one type of conductive oxide selected from the group consisting of $SiO_2$, $Al_2O_3$, $TiO_2$, ZnO and $ZrO_2$. If the barrier layer 25 contains such compounds, the obtained transparent conductor 20 will permit a greater thickness of the barrier layer 25 to be formed while maintaining transparency. Consequently, increase or temporal variation in the electrical resistance of the transparent conductor 20 will be more fully inhibited even in high-humidity environments or chemical substance atmospheres.

When the barrier layer 25 is in contact with or in continuity with the conductive particles 11 in the conductive layer 24, the barrier layer 25 is preferably a continuous conductive layer. Using a continuous conductive layer as the barrier layer 25 will help to ensure continuity between the conductive particles 11 through the continuous conductive barrier layer 25, even when the transparent conductor 20 has suffered breaks of the bonding points between conductive particles 11 due to swelling of the base 23. Consequently, increase or temporal variation in the electrical resistance of the transparent conductor 20 will be more fully inhibited even in high-humidity environments or chemical substance atmospheres.

<Base> The base 23 essentially has the same construction as the base 13, and is not necessarily required to contain a resin.

<Production process> A production process for the transparent conductor 20 of this embodiment will now be explained.

First, the base 23 is prepared. The base 23 may have the same construction as the aforementioned base 13.

Next, the barrier layer 25 is formed on the base 23. The barrier layer 25 is obtained by a sputtering or vapor deposition method, or a coating method. The barrier layer 25 used is preferably one having a lower gas permeability than the base 23. Also, formation of an anchor layer, or pretreatment such as corona treatment, may be carried out before formation of the barrier layer 25 on the base 23. By forming an anchor layer on the base 23 or carrying out corona treatment beforehand, it is possible to achieve more firm attachment of the barrier layer 25 onto the base 23. The anchor layer used may be made of polyurethane or silicone.

The barrier layer 25 is obtained by forming a continuous layer of a metal or inorganic oxide on the base 23. According to this embodiment, the barrier layer 25 is formed by sputtering of an inorganic oxide on the base 23. Using a sputtering method provides advantages of denseness and facilitated film thickness control.

The conductive layer 24 comprising the conductive particles 11 and second resin 12 is formed on the barrier layer 25 by the same method used to form the conductive layer 14 of the transparent conductor 10. This procedure yields a transparent conductor 20 as shown in FIG. 2.

The transparent conductor 20 obtained in the manner described above may be suitably used for an anti-noise part, heating element, EL electrode, backlight electrode, LCD, PDP, touch panel or the like.

Third Embodiment

A third embodiment of a transparent conductor according to the invention will now be explained. Constituent elements which are identical or corresponding to those of the first and second embodiments will be assigned identical reference numerals and will not be explained again.

Figure 3:
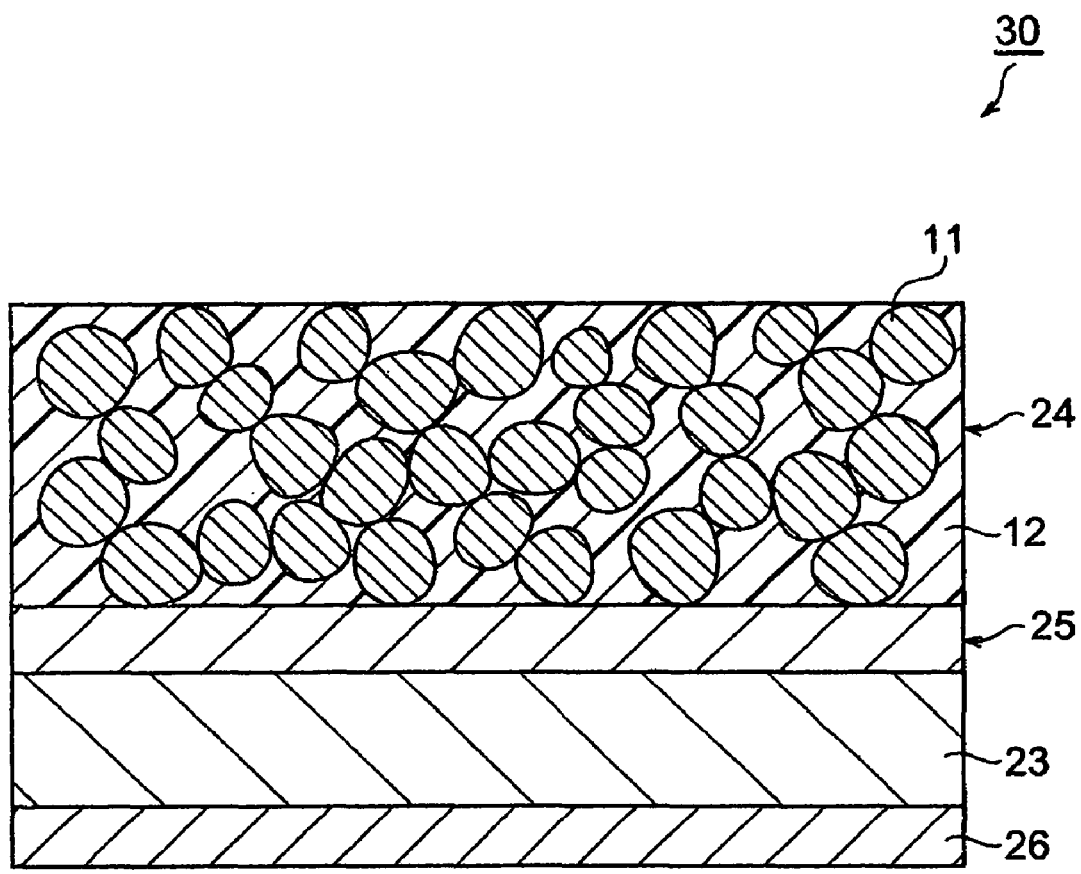
FIG. 3 is a schematic cross-sectional view of a third embodiment of a transparent conductor of the invention.

FIG. 3 is a schematic cross-sectional view of a third embodiment of a transparent conductor of the invention. As shown in FIG. 3, the transparent conductor 30 of this embodiment differs from the transparent conductor 20 of the second embodiment in that another barrier layer 26 is formed on the side of the base 23 opposite the conductive layer 24 side. This barrier layer 26 has the same function as the barrier layer 25. That is, the barrier layer 26, like the barrier layer 25, has a lower gas permeability than the base 23 and is composed of the same material as the barrier layer 25. The barrier layer 25 and barrier layer 26 may be made of the same material or different materials, so long as they have the same function.

By thus providing a barrier layer 25 and a barrier layer 26 on either side of the base 23, it is possible to further inhibit infiltration of moisture and organic gases into the base 23 of the transparent conductor 30 of this embodiment, and thus adequately prevent swelling of the base 23. Moreover, the barrier layer 26 itself has an expansion/contraction-inhibiting function. Thus, stretching of the conductive layer 24 that occurs with swelling of the base is prevented, and severing of bonding points between the conductive particles 11 is satisfactorily avoided. As a result, the transparent conductor 30 allows sufficient inhibition of increase or temporal variation in electrical resistance of the transparent conductor 30 to be achieved even in high-humidity environments or chemical substance atmospheres.

<Production process> A production process for the transparent conductor 30 of this embodiment will now be explained.

For production of the transparent conductor 30 of this embodiment, first the barrier layer 25 and barrier layer 26 are formed on either side of the base 23. Also, formation of an anchor layer, or pretreatment such as corona treatment, may be carried out before formation of the barrier layer 25 and barrier layer 26 on the base 23. By forming an anchor layer on the base 23 or carrying out corona treatment beforehand, it is possible to achieve more firm attachment of the barrier layer 25 and barrier layer 26 onto the base 23. The anchor layer used may be made of polyurethane or silicone.

The barrier layer 25 and barrier layer 26 are obtained by forming a continuous layer of a metal or inorganic oxide. According to this embodiment, the barrier layer 25 and barrier layer 26 are formed by sputtering of an inorganic oxide on the base 23. Using a sputtering method provides advantages of denseness and facilitated film thickness control.

The conductive layer 24 comprising the conductive particles 11 and second resin 12 is then formed on the barrier layer 25. The conductive layer 24 is formed in the same manner as for the transparent conductor 20 described above. This procedure yields a transparent conductor 30 as shown in FIG. 3.

The transparent conductor 30 obtained in the manner described above may be suitably used for an anti-noise part, heating element, EL electrode, backlight electrode, LCD, PDP, touch panel or the like.

Fourth Embodiment

A fourth embodiment of a transparent conductor according to the invention will now be explained. Constituent elements which are identical or corresponding to those of the first to third embodiments will be assigned identical reference numerals and will not be explained again.

Figure 4:
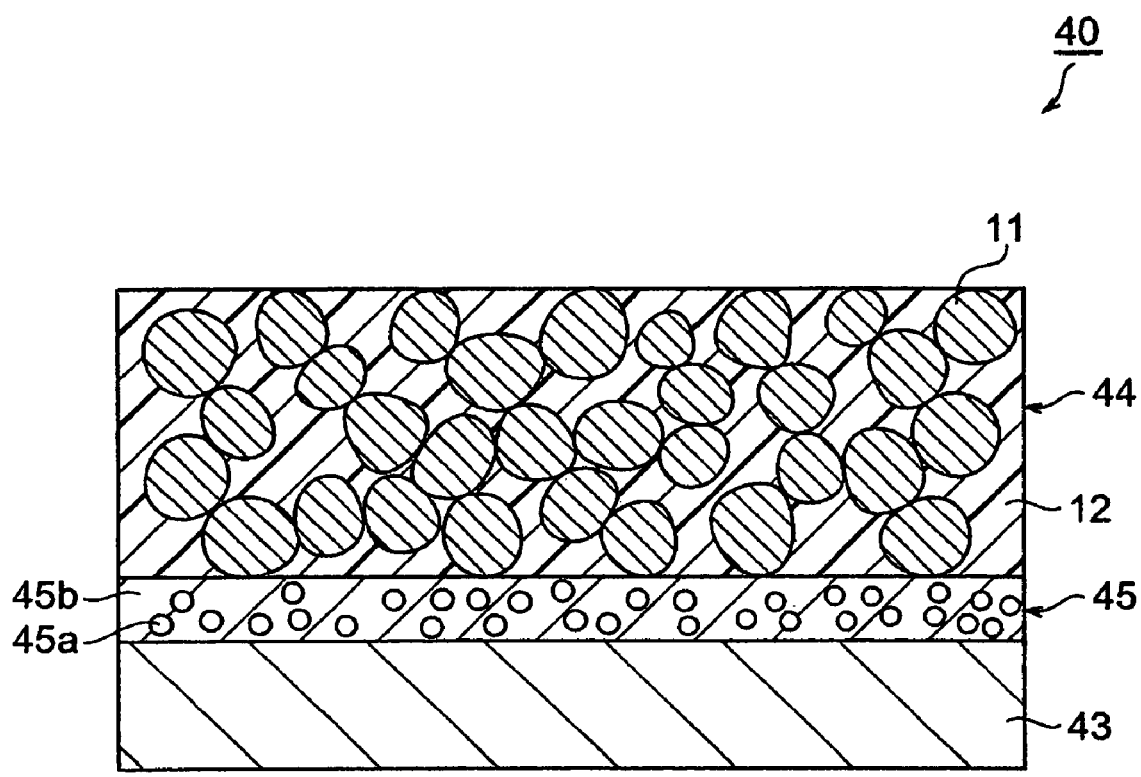
FIG. 4 is a schematic cross-sectional view of a fourth embodiment of a transparent conductor of the invention.

FIG. 4 is a schematic cross-sectional view of a fourth embodiment of a transparent conductor of the invention. As shown in FIG. 4, the transparent conductor 40 of this embodiment comprises a base 43, a conductive layer 44, and an intermediate layer 45 formed between the base 43 and conductive layer 44.

The conductive layer 44 comprises conductive particles 11 and a second resin 12, while the intermediate layer 45 is composed of a filler 45a and a resin 45b.

According to the transparent conductor 40 of this embodiment, the resin 45b is included in the intermediate layer 45 between the base 43 and the conductive layer 44, and the resin 45b performs a force buffering function when the base 43 undergoes distortion or bending during prolonged use of the transparent conductor 40, so that the conductive layer 44 is inhibited from distorting or bending along with the base 43. Consequently, cracking of the conductive layer 44 in the transparent conductor 40 is satisfactorily inhibited even when the transparent conductor 40 is used for prolonged periods.

In order to exhibit the effect described above, the resin 45b in the intermediate layer 45 is preferably a soft one, but a soft resin 45b will make it difficult to retain the shape of the intermediate layer 45 for long periods. In the transparent conductor 40 of this embodiment, therefore, a filler 45a is also added to the intermediate layer 45 in order to allow shape retention even when a soft resin 45b is used in the intermediate layer 45.

Moreover, since the intermediate layer 45 contains a filler 45a, it is possible to inhibit swelling of the resin 45b due to absorption of moisture and chemical substances. In other words, the filler 45a has a shape-retaining function whereby curling of the transparent conductor 40, caused by absorption of moisture and chemical substances and consequent swelling of the resin 45b, can be prevented.

The intermediate layer 45 will now be described in greater detail.

<Intermediate Layer>

The intermediate layer 45 is formed between the conductive layer 44 and the base 43, and it comprises a filler 45a and a resin 45b.

The filler 45a is not particularly restricted, and may be an organic filler such as aramid, polystyrene beads or acrylic beads, or an inorganic filler such as silica, glass, alumina, zirconia, titania, ITO, tin oxide or zinc oxide. Using such a filler 45a can increase the mechanical strength of the intermediate layer 45. Moreover, the filler 45a can inhibit infiltration of water or chemical substances into the interior of the transparent conductor.

Preferred among such materials are inorganic fillers such as silica, glass, ITO, tin oxide and zinc oxide. Using such inorganic fillers is advantageous for obtaining high transparency of the transparent conductor 40 of this embodiment.

More preferred among these inorganic fillers are ITO, tin oxide and zinc oxide. Such inorganic fillers exhibit conductivity by themselves, and can therefore provide electrical compensation for the transparent conductor 40. In other words, even when cracks occur in the conductive layer 44 and contact is broken within the conductive powder, these inorganic fillers can provide electrical continuity. Consequently, increase in the electrical resistance of the transparent conductor 40 can be inhibited. These conductive inorganic fillers may also be doped with one or more elements for the purpose of improving the conductivity.

The resin 45b is not particularly restricted, and specifically there may be used an acrylic resin, epoxy resin or the like. In addition, there may be used a compound obtained by curing a photocuring compound or thermosetting compound. Any photocuring compound may be used which is an organic compound cured by light, or any thermosetting compound may be used which is an organic compound cured by heat. Such organic compounds include substances serving as the starting material for the resin 45b, and specifically they include monomers, dimers, trimers or oligomers which can form the resin 45b.

Acrylic resins are particularly preferred. Their high transparency will result in superior light transmittance.

The resin 45b is preferably a photocuring compound. Using a photocuring compound for the curing compound will allow control of the curing reaction and will permit curing to be accomplished in a short period of time, thereby rendering the process management more convenient.

As photocuring compounds there are preferably used monomers containing vinyl groups, epoxy groups or derivatives thereof. These may be used alone or in mixtures of two or more types.

According to this embodiment, the resin 45b and the filler 45a are preferably chemically bonded together. In this case, since the positioning of the filler 45a in the intermediate layer 45 is fixed, the position of the filler 45a shifts when the transparent conductor 40 is distorted or bent, but the filler 45a can return to its original position when the force is released. Moreover, since the positioning of the filler 45a is fixed, swelling of the intermediate layer 45 is inhibited even when moisture or chemical substances infiltrate into the intermediate layer 45.

Therefore, the resin 45b and the filler 45a preferably have bondable substituents. As such bondable substituents there may be mentioned groups containing polymerizable double bonds such as acryloyl groups, methacryloyl groups and styrene groups, which can be bonded by photoradical polymerization or thermal radical polymerization, or epoxy groups, hydroxyl groups, alkoxy groups, ester groups, acyl groups such as acyl halides, halogen groups, alkoxysilane groups, silane groups such as chlorosilane groups and silazane groups, carboxylic groups, amide groups and amine groups, which react in the presence of water, acids, alkalis or catalysts or under heat.

When the resin 45b has such substituents, it will be able to bond not only with the filler 45a but also with the conductive particles 11. This will improve adhesion between the conductive layer 44 and the intermediate layer 45 and result in superior mechanical strength. The resin 45b of this embodiment preferably has a crosslinked structure. A crosslinked structure for the resin 45b can improve the aforementioned shape-memory effect and the effect of inhibiting swelling of the intermediate layer 45 when moisture or chemical substances have infiltrated into the interior of the transparent conductor 40. The crosslinked structure is not only crosslinking between the resin 45b itself but also crosslinked bonding between the resin 45b and the conductive particles 11 or filler 45a.

The Tg of the intermediate layer 45 in the transparent conductor 40 of this embodiment is preferably lower than the Tg of the conductive layer 44. This will allow the intermediate layer 45 to more fully perform the force-buffering function when the base 43 is distorted or bent, in order to inhibit distortion or bending of the conductive layer together with the base.

The Tg of the intermediate layer 45 is also preferably no higher than 20° C. If the Tg of the intermediate layer 45 is 20° C. or lower, the intermediate layer 45 can exhibit a greater function as a buffering material than if it exceeds 20° C., and it will be possible to inhibit cracking of the conductive layer 44 and increase in the electrical resistance of the transparent conductor 40 of this embodiment when it is used for prolonged periods. The Tg is the value measured by the DSC method with a temperature elevating rate of 20° C./min.

The Tg of the conductive layer 44 is preferably 40° C. or above. A Tg of 40° C. or above will allow retention of the shape of the transparent conductor 40 of this embodiment even when it is used for prolonged periods.

In the transparent conductor 40 described above, the difference in Tg of the intermediate layer 45 and the conductive layer 44 is preferably 40° C. or greater. This will allow the intermediate layer 45 to more effectively exhibit the aforementioned buffering function. As a result, the transparent conductor 40 will more satisfactorily inhibit cracking of the conductive layer 44 and increase in the electrical resistance of the transparent conductor 40 even when it is used for prolonged periods.

The conductive layer 44 used may be the same type as the conductive layer 14. The base 43 may also be the same type as the base 23.

<Production process> A production process for the transparent conductor 40 of this embodiment will now be explained.

First, the base 43 is placed on a glass panel. The intermediate layer 45 is then formed on the base 43. An anchor layer may also be formed on the base 43 before forming the intermediate layer 45, similar to the first to third embodiments.

The intermediate layer 45 is formed by coating a photocuring compound mixture comprising the filler 45a and resin 45b onto the base 43. The photocuring compound may optionally be dissolved in a solvent. In this case, the coating is preferably followed by a drying step. The coating method employed may be, for example, a reverse roll method, direct roll method, blade method, knife method, extrusion method, nozzle method, curtain method, gravure roll method, bar coating method, dip method, kiss coating method, spin coating method, squeeze method, spray method or sputtering method. The intermediate layer 45 may be formed by curing the photocuring compound with a high-energy beam. The high-energy beam may be ultraviolet light or an electron beam, γ-rays, X-rays or the like.

The conductive layer 44 comprising conductive particles 11 and a second resin 12 is then formed on the intermediate layer 45, in the same manner as the production process for the transparent conductor conductive layers 14, 24.

Finally, the glass panel is released to obtain a transparent conductor 40 as shown in FIG. 4.

The transparent conductor 40 obtained in the manner described above may be suitably used for an anti-noise part, heating element, EL electrode, backlight electrode, LCD, PDP, touch panel or the like.

The preferred embodiments of the invention described above are not intended to restrict the invention to such embodiments.

For example, a thermosetting compound may be used instead of the photocuring compound used to form the resin for production of the transparent conductors of the first to fourth embodiments. When a thermosetting compound is used, the thermosetting compound may be coated onto the intermediate layer or onto the base and then heated for curing to form the resin. The thermosetting compound may be dissolved in a solvent for this purpose, in which case the coating is preferably followed by a drying step. Also, a resin obtained by curing a thermosetting compound by heat treatment may be dissolved in a solvent and coated onto the intermediate layer or base and dried to form the resin.

The conductive layers in the embodiments described above may also serve as compressed layers. Such compressed layers may be produced in the following manner. First, conductive particles 11 are placed on the base. An anchor layer is preferably formed thereon beforehand to anchor the conductive particles 11 onto the base. Preforming an anchor layer will allow the conductive particles 11 to be firmly anchored on the base in order to facilitate placement of the conductive particles 11. Polyurethane, for example, may be suitably used for the anchor layer.

The conductive particles 11 on the base are compressed toward the base in order to form a compressed layer. The compression may be accomplished with a sheet press, roll press or the like.

The photocuring compound is then coated onto one side of the compressed layer. A portion of the photocuring compound will penetrate into the compressed layer during this time. An intermediate layer is then formed in the same manner as the previously described embodiments, and finally the base is formed on the photocuring compound and the structure is irradiated with a high-energy beam to harden the photocuring compound and obtain a transparent conductor.

The transparent conductor production process described above forms the conductive layer on the intermediate layer after forming the intermediate layer on the base, but alternatively there may be separately fabricated an intermediate layer formed on a base and an uncured conductive layer formed on a base, and then these structures may be attached together with the intermediate layer and uncured conductive layer facing each other to form the conductive layer on the intermediate layer.

For example, first a base is placed and fixed on a glass panel. Next, the photocuring compound serving as the resin for the intermediate layer is coated onto the base and cured with a high-energy beam to form the intermediate layer. The conductive particles 11 and second resin 12 are also coated onto the base to form the uncured conductive layer. The base used here may differ from the base of the invention.

The obtained intermediate layer and the uncured conductive layer are attached facing each other, and the uncured conductive layer is irradiated with a high-energy beam through the base for curing of the uncured conductive layer to form a conductive layer while bonding the conductive layer and the intermediate layer.

The base on the conductive layer side may be removed, to obtain a transparent conductor according to the invention.

The resin in the conductive layer or intermediate layer according to the first to fourth embodiments is a photocuring compound, and the photocuring compound is coated onto the intermediate layer or base and cured by light irradiation, but alternatively a resin obtained by curing the photocuring compound by light irradiation may be dissolved in a solvent and coated onto one side of the base and dried to form the transparent conductor.

Also, although the conductive layer was formed with conductive particles 11 and a second resin 12 in the first to fourth embodiments described above, it may instead be composed solely of conductive particles. In this case, the conductive layer is formed by a sputtering method.

EXAMPLES

The present invention will now be explained in greater detail through the following examples, with the understanding that the invention is in no way limited to these examples.

(Fabrication of Conductive Particles)

An aqueous solution obtained by dissolving 19.9 g of indium chloride tetrahydrate (product of Kanto Chemical Co., Ltd.) and 2.6 g of tin(II) chloride (product of Kanto Chemical Co., Ltd.) in 980 g of water was prepared and mixed with a 10-fold dilution of ammonia water (product of Kanto Chemical Co., Ltd.) in water, to produce a white precipitate (co-precipitate).

The liquid containing the produced co-precipitate was subjected to solid-liquid separation with a centrifuge and the solid was obtained. It was then loaded into 1000 g of water and dispersed with a homogenizer, and solid-liquid separation was again performed with a centrifuge. After repeating the dispersion and solid-liquid separation five times, the solid was dried and heated in a nitrogen atmosphere at 600° C. for 1 hour to obtain ITO powder (conductive particles).

Example 1

A 50 mm-square polyethylene terephthalate (PET) film (100 μm thickness, product of Teijin Corp.) was attached to a 50 mm-square glass panel using double-sided pressure-sensitive adhesive tape to affix the PET film as a base on the glass panel.

Next, 20 parts by weight of ethoxylated bisphenol A diacrylate (trade name: A-BPE-20 by Shin-Nakamura Chemical Industries Co., Ltd.), 40 parts by weight of polyethyleneglycol dimethacrylate (trade name: 14G by Shin-Nakamura Chemical Industries Co., Ltd.), 30 parts by weight of 2-hydroxy-3-phenoxypropyl acrylate (trade name 702A by Shin-Nakamura Chemical Industries Co., Ltd.), 10 parts by weight of a urethane-modified acrylate (trade name: UA-512 by Shin-Nakamura Chemical Industries Co., Ltd.) and 1 part by weight of a UV polymerization initiator (trade name: IRGACURE 907 by Ciba Specialty Chemicals Co., Ltd.) were combined to obtain a mixture. The mixture was used to form a film with a thickness of 10 μm on the base by a spin coating method. This was subjected to UV irradiation in a nitrogen atmosphere, using as the light source a high-voltage mercury lamp with a cumulative dose of 200 mJ/cm$^2$, to form an intermediate film.

Next, 50 parts by weight of an acrylic polymer (having an average molecular weight of about 50,000 and containing an average of 50 vinyl groups and an average of 25 triethoxysilane groups per molecule) containing 40 vol % ITO powder (30 nm mean particle size), 30 parts by weight of 2-hydroxy-3-phenoxypropyl acrylate (trade name: 702A by Shin-Nakamura Chemical Industries Co., Ltd.), 5 parts by weight of dipentaerythritol hexaacrylate (trade name: A-DPH by Shin-Nakamura Chemical Industries Co., Ltd.), 15 parts by weight of a urethane-modified acrylate (trade name: UA-100H by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto the obtained intermediate layer by a spin coating method and the MEK was evaporated off to form a film with a thickness of 20 μm. This was subjected to UV irradiation in a nitrogen atmosphere, using as the light source a high-voltage mercury lamp with a cumulative dose of 3000 mJ/cm$^2$, to form a conductive layer.

The glass panel was separated from the base to obtain a transparent conductor comprising a laminated conductive layer, intermediate layer and base.

Example 2

A 50 mm-square polyethylene terephthalate (PET) film (base with a 100 μm thickness, product of Teijin Corp.) was attached to a 50 mm-square glass panel using double-sided pressure-sensitive adhesive tape. This procedure was repeated to prepare bases situated on glass panels. These were temporarily designated as base A and base B.

Next, for formation of a third resin on the base A, 20 parts by weight of ethoxylated bisphenol A diacrylate (trade name: A-BPE-20 by Shin-Nakamura Chemical Industries Co., Ltd.), 40 parts by weight of polyethyleneglycol dimethacrylate (trade name: 14G by Shin-Nakamura Chemical Industries Co., Ltd.), 30 parts by weight of 2-hydroxy-3-phenoxypropyl acrylate (trade name 702A by Shin-Nakamura Chemical Industries Co., Ltd.), 10 parts by weight of a urethane-modified acrylate (trade name: UA-512 by Shin-Nakamura Chemical Industries Co., Ltd.) and 1 part by weight of a UV polymerization initiator (trade name: IRGACURE 907 by Ciba Specialty Chemicals Co., Ltd.) were combined to obtain a liquid coating film. This was used to form a film with a thickness of 10 μm on the base A by a spin coating method. It was then subjected to UV irradiation in a nitrogen atmosphere, using as the light source a high-voltage mercury lamp with a cumulative dose of 200 mJ/cm$^2$, to form an intermediate film. This was designated as cured laminate A.

Next, for formation of a conductive layer on the separately prepared base B, 50 parts by weight of an acrylic polymer (having an average molecular weight of about 50,000 and containing an average of 50 vinyl groups and an average of 25 triethoxysilane groups per molecule) containing 40 vol % ITO powder (30 nm mean particle size), 30 parts by weight of 2-hydroxy-3-phenoxypropyl acrylate (trade name: 702A by Shin-Nakamura Chemical Industries Co., Ltd.), 5 parts by weight of dipentaerythritol hexaacrylate (trade name: A-DPH by Shin-Nakamura Chemical Industries Co., Ltd.), 15 parts by weight of a urethane-modified acrylate (trade name: UA-100H by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto the base B by a spin coating method and the MEK was evaporated off to form a film with a thickness of 20 μm. This was designated as uncured laminate B.

The intermediate layer of the cured laminate A and the film-formed portion of the uncured laminate B were attached facing each other. The combination was then subjected to UV irradiation from the glass panel side of the uncured laminate B, using as the light source a high-voltage mercury lamp with a cumulative dose of 3000 mJ/cm$^2$ in a nitrogen atmosphere, to form a conductive layer while bonding it to the intermediate layer. Also, the glass panel bonded to the cured laminate A and uncured laminate B was removed, and then the uncured laminate B film was removed to obtain a transparent conductor comprising a laminated conductive layer and intermediate layer.

Example 3

A transparent conductor was obtained in the same manner as Example 1, except that 20 parts by weight of a urethane-modified acrylate (trade name: U-200AX by Shin-Nakamura Chemical Industries Co., Ltd.) was used instead of the ethoxylated bisphenol A diacrylate (trade name: A-BPE-20 by Shin-Nakamura Chemical Industries Co., Ltd.) used in Example 1.

Example 4

A transparent conductor was obtained in the same manner as Example 1, except that 15 parts by weight of a urethane-modified acrylate (trade name: U-4HA by Shin-Nakamura Chemical Industries Co., Ltd.) was used instead of the urethane-modified acrylate (trade name: UA-100H by Shin-Nakamura Chemical Industries Co., Ltd.) used in Example 1.

Comparative Example 1

A 50 mm-square polyethylene terephthalate (PET) film (base with 100 µm thickness, product of Teijin Corp.) was attached to a 50 mm-square glass panel using double-sided pressure-sensitive adhesive tape to affix the PET film as a base on the glass panel.

Next, for formation on the PET film base, 50 parts by weight of an acrylic polymer (having an average molecular weight of about 50,000 and containing an average of 50 vinyl groups and an average of 25 triethoxysilane groups per molecule) containing 40 vol % ITO powder (30 nm mean particle size), 30 parts by weight of 2-hydroxy-3-phenoxypropyl acrylate (trade name: 702A by Shin-Nakamura Chemical Industries Co., Ltd.), 5 parts by weight of dipentaerythritol hexaacrylate (trade name: A-DPH by Shin-Nakamura Chemical Industries Co., Ltd.), 15 parts by weight of a urethane-modified acrylate (trade name: UA-100H by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied by a spin coating method and the MEK was evaporated off to form a film with a thickness of 20 µm. This was subjected to UV irradiation in a nitrogen atmosphere, using as the light source a high-voltage mercury lamp with a cumulative dose of 3000 mJ/cm$^2$, to form a conductive layer.

The glass panel was separated from the base to obtain a transparent conductor comprising a laminated conductive layer and base.

Comparative Example 2

A transparent conductor was obtained in the same manner as Comparative Example 1, except that 20 parts by weight of a urethane-modified acrylate (trade name: UA-512 by Shin-Nakamura Chemical Industries Co., Ltd.) was used instead of the dipentaerythritol hexaacrylate (trade name: A-DPH by Shin-Nakamura Chemical Industries Co., Ltd.) and urethane-modified acrylate (trade name: UA-100H by Shin-Nakamura Chemical Industries Co., Ltd.) used in Comparative Example 1.

Example 5

A 50 mm-square polyethylene terephthalate (PET) film (base with 100 µm thickness, product of Teijin Corp.) was subjected to corona treatment on one side, and then a SiO$_2$ layer was formed to a thickness of 50 nm by RF sputtering to form an intermediate layer.

Next, 50 parts by weight of an acrylic polymer (having an average molecular weight of about 50,000 and containing an average of 50 vinyl groups and an average of 25 triethoxysilane groups per molecule) containing 40 vol % ITO powder (30 nm mean particle size), 25 parts by weight of 2-hydroxy-3-phenoxypropyl acrylate (trade name: 702A by Shin-Nakamura Chemical Industries Co., Ltd.), 25 parts by weight of a urethane-modified acrylate (trade name: UA-512 by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto the intermediate layer by a spin coating method and the MEK was evaporated off to form a film with a thickness of 20 µm. This was subjected to UV irradiation in a nitrogen atmosphere, using as the light source a high-voltage mercury lamp with a cumulative dose of 3000 mJ/cm$^2$, to form a conductive layer, thereby obtaining a transparent conductor.

Example 6

A 50 mm-square polyethylene terephthalate (PET) film (base with 100 µm thickness, product of Teijin Corp.) was subjected to corona treatment on one side, and then a SiO$_2$ layer was formed to a thickness of 50 nm by RF sputtering to form an intermediate layer.

Next, 50 parts by weight of an acrylic polymer (having an average molecular weight of about 50,000 and containing an average of 50 vinyl groups and an average of 25 triethoxysilane groups per molecule) containing 40 vol % ITO powder (30 nm mean particle size), 30 parts by weight of 2-hydroxy-3-phenoxypropyl acrylate (trade name: 702A by Shin-Nakamura Chemical Industries Co., Ltd.), 5 parts by weight of dipentaerythritol hexaacrylate (trade name: A-DPH by Shin-Nakamura Chemical Industries Co., Ltd.), 15 parts by weight of a urethane-modified acrylate (trade name: UA-100H by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto the intermediate layer by a spin coating method and the MEK was evaporated off to form a film with a thickness of 20 µm. This was subjected to UV irradiation in a nitrogen atmosphere, using as the light source a high-voltage mercury lamp with a cumulative dose of 3000 mJ/cm$^2$, to form a conductive layer, thereby obtaining a transparent conductor.

Example 7

A 50 mm-square polyethylene terephthalate (PET) film (base with 100 µm thickness, product of Teijin Corp.) was subjected to corona treatment on both sides, and then SiO$_2$ layers were formed to a thickness of 50 nm on both sides by RF sputtering to form intermediate layers.

Next, 50 parts by weight of an acrylic polymer (having an average molecular weight of about 50,000 and containing an average of 50 vinyl groups and an average of 25 triethoxysilane groups per molecule) containing 40 vol % ITO powder (30 nm mean particle size), 25 parts by weight of 2-hydroxy-3-phenoxypropyl acrylate (trade name: 702A by Shin-Nakamura Chemical Industries Co., Ltd.), 25 parts by weight of a urethane-modified acrylate (trade name: UA-512 by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto one of the intermediate layers by a spin coating method and the MEK was evaporated off to form a film with a thickness of 20 μm. This was subjected to UV irradiation in a nitrogen atmosphere, using as the light source a high-voltage mercury lamp with a cumulative dose of 3000 mJ/cm$^2$, to form a conductive layer, thereby obtaining a transparent conductor.

Example 8

A 50 mm-square polyethylene terephthalate (PET) film (base with 100 μm thickness, product of Teijin Corp.) was subjected to corona treatment on one side, and then 50 parts by weight of an acrylic polymer (having an average molecular weight of about 50,000 and containing an average of 50 vinyl groups and an average of 25 triethoxysilane groups per molecule) containing 50 vol % SiO$_2$ powder (trade name AEROSIL 300 by Nihon Aerosil Co., Ltd.), 10 parts by weight of 2-hydroxy-3-phenoxypropyl acrylate (trade name: 702A by Shin-Nakamura Chemical Industries Co., Ltd.), 10 parts by weight of dipentaerythritol hexaacrylate (trade name: A-DPH by Shin-Nakamura Chemical Industries Co., Ltd.), 30 parts by weight of a urethane-modified acrylate (trade name: UA-100H by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto the corona-treated side by a spin coating method and the MEK was evaporated off to form a film with a thickness of 5 μm. This was subjected to UV irradiation in a nitrogen atmosphere, using as the light source a high-voltage mercury lamp with a cumulative dose of 200 mJ/cm$^2$, to form an intermediate layer.

Next, 50 parts by weight of an acrylic polymer (having an average molecular weight of about 50,000 and containing an average of 50 vinyl groups and an average of 25 triethoxysilane groups per molecule) containing 40 vol % ITO powder (30 nm mean particle size), 30 parts by weight of 2-hydroxy-3-phenoxypropyl acrylate (trade name: 702A by Shin-Nakamura Chemical Industries Co., Ltd.), 5 parts by weight of dipentaerythritol hexaacrylate (trade name: A-DPH by Shin-Nakamura Chemical Industries Co., Ltd.), 15 parts by weight of a urethane-modified acrylate (trade name: UA-100H by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto the intermediate layer by a spin coating method and the MEK was evaporated off to form a film with a thickness of 20 μm. This was subjected to UV irradiation in a nitrogen atmosphere, using as the light source a high-voltage mercury lamp with a cumulative dose of 3000 mJ/cm$^2$, to form a conductive layer, thereby obtaining a transparent conductor.

Example 9

A 50 mm-square polyethylene terephthalate (PET) film (base with 100 μm thickness, product of Teijin Corp.) was subjected to corona treatment on one side, and then a SiO$_2$ layer was formed to a thickness of 50 nm by RF sputtering to form an intermediate layer. Also, 50 parts by weight of an acrylic polymer (having an average molecular weight of about 50,000 and containing an average of 50 vinyl groups and an average of 25 triethoxysilane groups per molecule) containing 50 vol % SiO$_2$ powder (trade name AEROSIL 300 by Nihon Aerosil Co., Ltd.), 10 parts by weight of 2-hydroxy-3-phenoxypropyl acrylate (trade name: 702A by Shin-Nakamura Chemical Industries Co., Ltd.), 10 parts by weight of dipentaerythritol hexaacrylate (trade name: A-DPH by Shin-Nakamura Chemical Industries Co., Ltd.), 30 parts by weight of a urethane-modified acrylate (trade name: UA-100H by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto the SiO$_2$ layer by a spin coating method and the MEK was evaporated off to form a film with a thickness of 5 μm. This was subjected to UV irradiation in a nitrogen atmosphere, using as the light source a high-voltage mercury lamp with a cumulative dose of 1000 mJ/cm$^2$, to form an intermediate layer.

Next, 50 parts by weight of an acrylic polymer (having an average molecular weight of about 50,000 and containing an average of 50 vinyl groups and an average of 25 triethoxysilane groups per molecule) containing 40 vol % ITO powder (30 nm mean particle size), 25 parts by weight of 2-hydroxy-3-phenoxypropyl acrylate (trade name: 702A by Shin-Nakamura Chemical Industries Co., Ltd.), 25 parts by weight of a urethane-modified acrylate (trade name: UA-512 by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto the side opposite the intermediate layer side by a spin coating method and the MEK was evaporated off to form a film with a thickness of 20 μm. This was subjected to UV irradiation in a nitrogen atmosphere, using as the light source a high-voltage mercury lamp with a cumulative dose of 3000 mJ/cm$^2$, to form a conductive layer, thereby obtaining a transparent conductor.

Example 10

A 50 mm-square polyethylene terephthalate (PET) film (base with 100 μm thickness, product of Teijin Corp.) was subjected to corona treatment on both sides, and then a SiO$_2$ layer was formed to a thickness of 50 nm by RF sputtering on one side. Also, 50 parts by weight of an acrylic polymer (having an average molecular weight of about 50,000 and containing an average of 50 vinyl groups and an average of 25 triethoxysilane groups per molecule) containing 50 vol % SiO$_2$ powder (trade name AEROSIL 300 by Nihon Aerosil Co., Ltd.), 10 parts by weight of 2-hydroxy-3-phenoxypropyl acrylate (trade name: 702A by Shin-Nakamura Chemical Industries Co., Ltd.), 10 parts by weight of dipentaerythritol hexaacrylate (trade name: A-DPH by Shin-Nakamura Chemical Industries Co., Ltd.), 30 parts by weight of a urethane-modified acrylate (trade name: UA-100H by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto the side opposite the SiO$_2$ layer by a spin coating method and the MEK was evaporated off to form a film with a thickness of 5 μm. This was subjected to UV irradiation in a nitrogen atmosphere, using as the light source a high-voltage mercury lamp with a cumulative dose of 1000 mJ/cm², to form an intermediate layer.

Next, 50 parts by weight of an acrylic polymer (having an average molecular weight of about 50,000 and containing an average of 50 vinyl groups and an average of 25 triethoxysilane groups per molecule) containing 40 vol % ITO powder (30 nm mean particle size), 25 parts by weight of 2-hydroxy-3-phenoxypropyl acrylate (trade name: 702A by Shin-Nakamura Chemical Industries Co., Ltd.), 25 parts by weight of a urethane-modified acrylate (trade name: UA-512 by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto the $SiO_2$ layer side by a spin coating method and the MEK was evaporated off to form a film with a thickness of 20 μm. This was subjected to UV irradiation in a nitrogen atmosphere, using as the light source a high-voltage mercury lamp with a cumulative dose of 3000 mJ/cm², to form a conductive layer, thereby obtaining a transparent conductor.

Example 11

A 50 mm-square polyethylene terephthalate (PET) film (base with 100 μm thickness, product of Teijin Corp.) was subjected to corona treatment on both sides, and then a $SiO_2$ layer was formed to a thickness of 50 nm by RF sputtering on both sides. Also, 50 parts by weight of an acrylic polymer (having an average molecular weight of about 50,000 and containing an average of 50 vinyl groups and an average of 25 triethoxysilane groups per molecule) containing 50 vol % $SiO_2$ powder (trade name AEROSIL 300 by Nihon Aerosil Co., Ltd.), 10 parts by weight of 2-hydroxy-3-phenoxypropyl acrylate (trade name: 702A by Shin-Nakamura Chemical Industries Co., Ltd.), 10 parts by weight of dipentaerythritol hexaacrylate (trade name: A-DPH by Shin-Nakamura Chemical Industries Co., Ltd.), 30 parts by weight of a urethane-modified acrylate (trade name: UA-100H by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto one of the $SiO_2$ layer-formed sides of the base by a spin coating method and the MEK was evaporated off to form a film with a thickness of 5 μm. This was subjected to UV irradiation in a nitrogen atmosphere, using as the light source a high-voltage mercury lamp with a cumulative dose of 1000 mJ/cm², to form an intermediate layer.

Next, 50 parts by weight of an acrylic polymer (having an average molecular weight of about 50,000 and containing an average of 50 vinyl groups and an average of 25 triethoxysilane groups per molecule) containing 40 vol % ITO powder (30 nm mean particle size), 25 parts by weight of 2-hydroxy-3-phenoxypropyl acrylate (trade name: 702A by Shin-Nakamura Chemical Industries Co., Ltd.), 25 parts by weight of a urethane-modified acrylate (trade name: UA-512 by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied, by a spin coating method, onto the exposed $SiO_2$ layer opposite the side on which the previous $SiO_2$ powder-containing paste had been coated, and the MEK was evaporated off to form a film with a thickness of 20 μm. This was subjected to UV irradiation in a nitrogen atmosphere, using as the light source a high-voltage mercury lamp with a cumulative dose of 3000 mJ/cm², to form a conductive layer, thereby obtaining a transparent conductor.

Example 12

A 10 cm×30 cm square polyethylene terephthalate (PET) film (100 μm thickness, product of Teijin Corp.) was attached to the edge of a glass panel using double-sided pressure-sensitive adhesive tape to affix the base on the glass panel.

Next, 20 parts by weight of ethoxylated bisphenol A diacrylate (trade name: A-BPE-20 by Shin-Nakamura Chemical Industries Co., Ltd.), 35 parts by weight of polyethyleneglycol dimethacrylate (trade name: 14G by Shin-Nakamura Chemical Industries Co., Ltd.), 25 parts by weight of 2-hydroxy-3-phenoxypropyl acrylate (trade name 702A by Shin-Nakamura Chemical Industries Co., Ltd.), 10 parts by weight of a urethane-modified acrylate (trade name: UA-512 by Shin-Nakamura Chemical Industries Co., Ltd.), 10 parts by weight of an acrylic polymer (having an average molecular weight of about 50,000 and containing an average of 50 acryloyl groups and an average of 25 triethoxysilane groups per molecule), 1 part by weight of a UV polymerization initiator (trade name: IRGACURE 907 by Ciba Specialty Chemicals Co., Ltd.) and 10 parts by weight of silicon dioxide powder (filler, trade name: AEROSIL 380 by Nihon Aerosil Co., Ltd.) were combined to obtain a mixture. The mixture was used to form a film with a cured thickness of 10 μm on the base by a bar coating method. This was subjected to UV irradiation using as the light source a high-voltage mercury lamp with a cumulative dose of 1000 mJ/cm², to form an intermediate film.

Next, 50 parts by weight of an acrylic polymer (having an average molecular weight of about 50,000 and containing an average of 50 vinyl groups and an average of 25 triethoxysilane groups per molecule) containing 40 vol % ITO powder (30 nm mean particle size), 30 parts by weight of 2-hydroxy-3-phenoxypropyl acrylate (trade name: 702A by Shin-Nakamura Chemical Industries Co., Ltd.), 5 parts by weight of dipentaerythritol hexaacrylate (trade name: A-DPH by Shin-Nakamura Chemical Industries Co., Ltd.), 15 parts by weight of a urethane-modified acrylate (trade name: UA-100H by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied over the obtained intermediate layer by a bar coating method and the MEK was evaporated off to form a film with a thickness of 20 μm. This was subjected to UV irradiation in a nitrogen atmosphere, using as the light source a high-voltage mercury lamp with a cumulative dose of 3000 mJ/cm², to form a conductive layer.

The glass panel was separated from the base to obtain a transparent conductor comprising a laminated conductive layer, intermediate layer and base.

Example 13

A transparent conductor was obtained in the same manner as Example 12, except that the silicon dioxide used in Example 12 was changed to 5 parts by weight.

Example 14

A transparent conductor was obtained in the same manner as Example 12, except that the composition of the mixture for formation of the intermediate layer of Example 12 was changed to 30 parts by weight of 2-hydroxy-3-phenoxypropyl acrylate (trade name 702A by Shin-Nakamura Chemical Industries Co., Ltd.), 20 parts by weight of phenoxypolyethyleneglycol acrylate (AMP-60G by Shin-Nakamura Chemical Industries Co., Ltd.), 20 parts by weight of 2-hydroxyethyl methacrylate (trade name: BLEMMER E by Nippon Oil & Fats Co., Ltd.), 10 parts by weight of β-methacryloyloxyethylhydrogen phthalate (trade name: CB-1 by Shin-Nakamura Chemical Industries Co., Ltd.), 20 parts by weight of an acrylic polymer (having an average molecular weight of about 50,000 and containing an average of 1 acryloyl group and an average of 25 triethoxysilane groups per molecule), 1 part by weight of a UV polymerization initiator (trade name: IRGACURE 907 by Ciba Specialty Chemicals Co., Ltd.) and 10 parts by weight of silicon dioxide powder (filler, trade name: AEROSIL 380 by Nihon Aerosil Co., Ltd.).

Example 15

A transparent conductor was obtained in the same manner as Example 14, except that the acryl polymer used in Example 14 was having an average molecular weight of about 25,000.

Comparative Example 3

A 50 mm-square polyethylene terephthalate (PET) film (base with 100 μm thickness, product of Teijin Corp.) was subjected to corona treatment on one side.

Next, 50 parts by weight of an acrylic polymer (having an average molecular weight of about 50,000 and containing an average of 50 vinyl groups and an average of 25 triethoxysilane groups per molecule) containing 40 vol % ITO powder (30 nm mean particle size), 25 parts by weight of 2-hydroxy-3-phenoxypropyl acrylate (trade name: 702A by Shin-Nakamura Chemical Industries Co., Ltd.), 25 parts by weight of a urethane-modified acrylate (trade name: UA-512 by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto the corona-treated side by a spin coating method and the MEK was evaporated off to form a film with a thickness of 20 μm. This was subjected to UV irradiation in a nitrogen atmosphere, using as the light source a high-voltage mercury lamp with a cumulative dose of 3000 mJ/cm$^2$, to form a conductive layer, thereby obtaining a transparent conductor.

Comparative Example 4

A 50 mm-square polyethylene terephthalate (PET) film (base with 100 μm thickness, product of Teijin Corp.) was subjected to corona treatment on one side.

Next, 50 parts by weight of an acrylic polymer (having an average molecular weight of about 50,000 and containing an average of 50 vinyl groups and an average of 25 triethoxysilane groups per molecule) containing 40 vol % ITO powder (30 nm mean particle size), 30 parts by weight of 2-hydroxy-3-phenoxypropyl acrylate (trade name: 702A by Shin-Nakamura Chemical Industries Co., Ltd.), 5 parts by weight of dipentaerythritol hexaacrylate (trade name: A-DPH by Shin-Nakamura Chemical Industries Co., Ltd.), 15 parts by weight of a urethane-modified acrylate (trade name: UA-100H by Shin-Nakamura Chemical Industries Co., Ltd.), 1 part by weight of a UV polymerization initiator (trade name: IRGACURE 907 by Ciba Specialty Chemicals Co., Ltd.) and 50 parts by weight of methyl ethyl ketone (MEK) were mixed together to form a paste. The paste was applied onto the corona-treated side by a spin coating method and the MEK was evaporated off to form a film with a thickness of 20 μm. This was subjected to UV irradiation in a nitrogen atmosphere, using as the light source a high-voltage mercury lamp with a cumulative dose of 3000 mJ/cm$^2$, to form a conductive layer, thereby obtaining a transparent conductor.

Comparative Example 5

A transparent conductor was obtained in the same manner as Example 14, except that no silicon dioxide powder was used.

[Evaluation method] (Evaluation of resistance of transparent conductor before and after humidification)

The electrical resistance values for the transparent conductors obtained in Examples 1-11 and Comparative Examples 1-4 were evaluated in the following manner. A four-terminal, four-point probing surface resistance measuring device (MCP-T600 by Mitsubishi Chemical Co., Ltd.) was used for measurement of the electrical resistance at a pre-established measuring point on each obtained transparent conductor, and this value was recorded as the initial electrical resistance. The transparent conductor was then placed in an environment of 60° C., 95% RH for 1000 hours and removed, and when the temperature of the transparent conductor fell to room temperature, the electrical resistance value was again measured at the measuring point established before humidification, and recorded as the humidified electrical resistance. The variation was calculated according to the following formula:

Variation=Humidified electrical resistance/initial electrical resistance

The results are shown in Table 2.

(Measurement of Tg)

The transparent conductors obtained in Examples 1-4 and Comparative Examples 1 and 2 were used for measurement of the Tg values of the intermediate layer and base. The Tg is the value measured for a 30 mg sample weight by the DSC method in a nitrogen atmosphere with a temperature elevating rate of 20° C./min. The results are shown in Table 2.

TABLE 2

|  | Initial electrical resistance kΩ/□ | Humidified electrical resistance kΩ/□ | Variation | Tg of material used for conductive layer (° C.) | Tg of material used for intermediate layer (° C.) |
| --- | --- | --- | --- | --- | --- |
| Example 1 | 4.782 | 7.890 | 1.65 | 86.3 | 7.3 |
| Example 2 | 4.355 | 7.447 | 1.71 | 85.5 | 7.4 |
| Example 3 | 5.168 | 9.251 | 1.79 | 86.6 | −3.7 |
| Example 4 | 4.617 | 8.264 | 1.79 | 79.4 | 6.9 |

TABLE 2-continued

|  | Initial electrical resistance kΩ/□ | Humidified electrical resistance kΩ/□ | Variation | Tg of material used for conductive layer (° C.) | Tg of material used for intermediate layer (° C.) |
|---|---|---|---|---|---|
| Comp. Ex. 1 | 5.231 | 15.33 | 2.93 | 85.9 | — |
| Comp. Ex. 2 | 4.895 | 15.22 | 3.11 | 25.1 | — |
| Example 5 | 5.213 | 8.132 | 1.56 | — | — |
| Example 6 | 4.578 | 6.501 | 1.42 | — | — |
| Example 7 | 4.681 | 6.179 | 1.32 | — | — |
| Example 8 | 4.879 | 8.197 | 1.68 | — | — |
| Example 9 | 4.786 | 7.083 | 1.48 | — | — |
| Example 10 | 4.947 | 6.381 | 1.29 | — | — |
| Example 11 | 4.729 | 5.737 | 1.20 | — | — |
| Comp. Ex. 3 | 4.781 | 16.92 | 3.54 | — | — |
| Comp. Ex. 4 | 5.231 | 15.33 | 2.93 | — | — |

As shown in Table 2, Examples 1-4 which each had an intermediate layer formed between the base and conductive layer had lower electrical resistance values than Comparative Examples 1 and 2 which had no intermediate layer, thus indicating that increase in the electrical resistance had been satisfactorily inhibited.

This result confirmed that, in a transparent conductor provided with a base comprising a first resin, a conductive layer comprising conductive particles and a second resin and an intermediate layer composed of a resin formed between the base and the conductive layer, limiting the glass transition temperature Tg of the intermediate layer to be lower than the Tg of the conductive layer can adequately inhibit increase or temporal variation in the electrical resistance even in a high-humidity environment.

Examples 5-11 which each employed a barrier layer had lower electrical resistance values than Comparative Examples 3 and 4 which had no barrier layer, and therefore increase in the electrical resistance had been satisfactorily inhibited.

This result confirmed that, in a transparent conductor provided with a base, a conductive layer comprising conductive particles and a resin, and a barrier layer comprising a metal or inorganic compound, forming the barrier layer between the base and the conductive layer and/or on the side of the base opposite the conductive layer can adequately inhibit increase or temporal variation in the electrical resistance even in a high-humidity environment.

(Evaluation of Resistance of Transparent Conductor Before and After Load)

The electrical resistance values for the transparent conductors obtained in Examples 12-16 were evaluated in the following manner. After cutting each obtained transparent conductor into a 50 mm square, a four-terminal, four-point probing surface resistance measuring device (MCP-T600 by Mitsubishi Chemical Co., Ltd.) was used for measurement of the electrical resistance at a pre-established measuring point on the conductive layer surface, and this value was recorded as the initial electrical resistance.

Next, 5 mm×45 mm double-sided pressure-sensitive adhesive tape was attached to all of the edges of the surface of the conductive layer of the transparent conductor. Separately, a 50 mm-square ITO sputtered glass panel was prepared and a 100μ-thick 5 mm×45 mm spacer was attached to all of the edges on its ITO side using double-sided pressure-sensitive adhesive tape. The double-sided pressure-sensitive adhesive tape attached to the conductive layer surface and the spacer attached to the ITO side were pasted together without shifting their positions. As a break point load test, a load of 200 g, 2 Hz was vertically applied to the center of the transparent conductor through silicon rubber with an R8-shaped point in a 25° C., 50% RH environment. After repeating this procedure 100,000 times, the surface resistance value of the conductive layer of the transparent conductor was measured by the same method described above. The measured value was recorded as the loaded surface resistance value. The variation was calculated according to the following formula:

Variation=Loaded surface electrical resistance/initial electrical resistance

The results are shown in Table 3.

(Measurement of Tg)

The transparent conductors obtained in Examples 12-16 were used for measurement of the Tg value of the intermediate layer in the same manner as for Examples 1-4 and Comparative Examples 1 and 2. The results are shown in Table 3.

TABLE 3

|  | Initial surface resistance Ω/□ | Loaded surface resistance Ω/□ | Variation | Tg of intermediate layer (° C.) |
|---|---|---|---|---|
| Example 12 | 4.31 | 4.53 | 1.05 | 18.6 |
| Example 13 | 4.51 | 4.69 | 1.04 | 14.4 |
| Example 14 | 4.48 | 4.61 | 1.03 | 11.3 |
| Example 15 | 4.37 | 4.68 | 1.07 | 10.9 |
| Comp. Ex. 5 | 4.36 | 5.45 | 1.25 | 9.5 |

As shown in Table 3, Examples 12-15 which each had an intermediate layer formed between the base and the conductive layer had lower electrical resistance values than Comparative Example 5 which had no intermediate layer, and therefore increase in the electrical resistance had been satisfactorily inhibited.

This result confirmed that, in a transparent conductor provided with a base, a conductive layer and an intermediate layer comprising a resin and a filler, forming the intermediate layer between the base and the conductive layer can satisfactorily inhibit cracking in the conductive layer even with prolonged periods of use.

As explained above, the transparent conductor of the present invention is provided with a base comprising a first a resin, a conductive layer comprising conductive particles and a second resin, and an intermediate layer composed of a third resin formed between the base and the conductive layer, wherein the glass transition temperature Tg of the intermediate layer is lower than the Tg of the conductive layer, thereby allowing increase or temporal variation in the electrical resistance of the transparent conductor to be satisfactorily inhibited even in high-humidity environments. Moreover, with a transparent conductor according to the invention provided with a base, a conductive layer comprising conductive particles and a resin and a barrier layer comprising a metal and an inorganic compound, wherein the barrier layer is formed between the base and the conductive layer and/or on the side of the base opposite the conductive layer side, it is also possible to satisfactorily inhibit increase or temporal variation in the electrical resistance of the transparent conductor even in high-humidity environments. In addition, in a transparent conductor of the invention provided with a base, a conductive layer and an intermediate layer comprising a resin and a filler wherein the intermediate layer is formed between the base and the conductive layer, it is possible to satisfactorily inhibit cracking of the conductive layer without impairing the conductivity or transparency of the transparent conductor even during periods of prolonged use.

What is claimed is:

1. A transparent conductor provided with
    a base,
    a conductive layer comprising conductive particles and a resin, wherein surfaces of said conductive particles are treated with a surface treatment agent having hydrophobic vinyl end groups, and
    a barrier layer comprising an acrylic polymer and at least one inorganic compound selected from the group consisting of $SiO_2$, $Al_2O_3$, $TiO_2$, ZnO and $ZrO_2$,
    wherein said barrier layer is formed between said base and said conductive layer, said barrier layer is a continuous conductive layer, and said barrier layer is in contact with at least a part of said conductive particles in said conductive layer.

2. A transparent conductor according to claim 1, wherein said barrier layer is formed between said base and said conductive layer and on the side of said base opposite said conductive layer side.

3. A transparent conductor according to claim 1, wherein said base comprises a polyester film, a polyolefin film, a polycarbonate film, or a norbornene film, and the moisture permeability of said barrier layer is lower than that of said base.

4. A transparent conductor according to claim 1, wherein said conductive layer is a compressed layer formed by compressing said conductive particles.

5. A transparent conductor according to claim 1, wherein said barrier layer comprises an acrylic polymer and $SiO_2$.

* * * * *